(12) United States Patent
Liu

(10) Patent No.: US 6,834,331 B1
(45) Date of Patent: Dec. 21, 2004

(54) SYSTEM AND METHOD FOR IMPROVING FLASH MEMORY DATA INTEGRITY

(75) Inventor: Gwoho H. Liu, Scotts Valley, CA (US)

(73) Assignee: Starfish Software, Inc., Scotts Valley, CA (US)

( * ) Notice: Subject to any disclaimer, the term of this patent is extended or adjusted under 35 U.S.C. 154(b) by 751 days.

(21) Appl. No.: 09/696,583

(22) Filed: Oct. 24, 2000

(51) Int. Cl.[7] .............................................. G06F 12/12
(52) U.S. Cl. ........................ 711/156; 711/103; 711/165; 714/1
(58) Field of Search ................................ 711/103, 154, 711/156, 162, 200, 165; 714/1, 2; 365/189.01, 185.03

(56) References Cited

U.S. PATENT DOCUMENTS

| | | |
|---|---|---|
| 4,491,914 A | 1/1985 | Sujaku |
| 4,794,558 A | 12/1988 | Thompson |
| 4,805,109 A | 2/1989 | Kroll et al. |
| 5,018,096 A | 5/1991 | Aoyama |
| 5,163,147 A | 11/1992 | Orita |
| 5,233,613 A | 8/1993 | Allen et al. |
| 5,247,659 A | 9/1993 | Curran et al. |
| 5,257,378 A | 10/1993 | Sideserf et al. |

(List continued on next page.)

FOREIGN PATENT DOCUMENTS

| | | |
|---|---|---|
| EP | 0 632 629 | 1/1995 |
| EP | 0 681 298 | 11/1995 |

OTHER PUBLICATIONS

Hyung Gyu Lee et al., "Energy–Aware Memory Allocation In Heterogeneous Non–Volatile Memory Systems", Proceedings of the 2003 International symposium on Low power electronics and design, pp.: 420–423, Aug. 2003.*

Excerpts from 3048 Hardware Manual, dated 1995, consisting of pp. 577–582.

Hitachi Single–Chip Microcomputer H8/3048 Series Hardware Manual, Jan. 1995, pp. 1, 423–424, 535, 552–553, 565–566, 571 and 604.

"MC68HC11 EEPROM Programming From a Personal Computer" AN1010, 1988 Motorola Semiconductor Application Note, pp. 1–12.

*Primary Examiner*—Pierre-Michel Bataille
(74) *Attorney, Agent, or Firm*—Ernest J. Beffel, Jr.; Haynes Beffel & Wolfeld LLP

(57) ABSTRACT

Sector and block layers for a database management system improve the integrity of data in a flash memory in view of possible data corruptions caused by power interruptions. The sector layer implements a reclaiming function for copying valid data from a source to a destination so that the source sector can be erased. A sector state register indicates whether a sector is in use, in a first reclaiming state, in a second reclaiming state or in a reclaimed state. A destination sector register for a reclaiming source points to a reclaiming destination. A limitation is placed on permissible reclaiming sources for a given reclaiming destination, so that, if a first sector is a permissible source for a second sector, then the second sector cannot be a permissible source for the first sector. On power up, the sector layer is able to determine if a reclaiming operation was in progress when power was interrupted and, if so, which sectors were the source and destination, and at what point the reclaiming operation must be resumed to complete the operation successfully. At the block layer, a block state register indicates whether a data block is in an erased state, a written state, a committed state, a freed state, a freed and committed state, or a dirty state, a block label register is used to determine whether multiple blocks contain different versions of the same data item, and a block version register indicates which of multiple versions of the same data item were written more recently. On power up, data blocks that may have corrupted data from the prior power interruption are marked as dirty or invalid, and a block-level commit function is performed, in case such an operation was interrupted during the prior power interruption.

21 Claims, 9 Drawing Sheets

U.S. PATENT DOCUMENTS

| | | | |
|---|---|---|---|
| 5,276,839 A | 1/1994 | Robb et al. | |
| 5,278,976 A | 1/1994 | Wu | |
| 5,349,697 A | 9/1994 | Pelkonen | |
| 5,388,267 A | 2/1995 | Chan et al. | |
| 5,404,494 A | 4/1995 | Garney | |
| 5,432,927 A | 7/1995 | Grote et al. | |
| 5,438,549 A | 8/1995 | Levy | |
| 5,444,664 A | 8/1995 | Kuroda et al. | |
| 5,444,861 A | 8/1995 | Adamec et al. | |
| 5,467,286 A | 11/1995 | Pyle et al. | |
| 5,473,758 A | 12/1995 | Allen et al. | |
| 5,495,593 A | 2/1996 | Elmer et al. | |
| 5,504,903 A | 4/1996 | Chen et al. | |
| 5,557,777 A | 9/1996 | Culbert | |
| 5,564,032 A | 10/1996 | Aota et al. | |
| 5,566,335 A | 10/1996 | Nash et al. | |
| 5,574,926 A | 11/1996 | Mizazawa et al. | |
| 5,579,479 A | 11/1996 | Plum | |
| 5,581,723 A | 12/1996 | Hasbun et al. | |
| 5,603,056 A | 2/1997 | Totani | |
| 5,687,345 A | 11/1997 | Matsubara et al. | |
| 5,692,146 A * | 11/1997 | Yamamoto et al. | 711/200 |
| 5,701,492 A | 12/1997 | Wadsworth et al. | |
| 5,768,208 A | 6/1998 | Bruwer et al. | |
| 5,826,075 A | 10/1998 | Bealkowski et al. | |
| 5,835,761 A | 11/1998 | Ishii et al. | |
| 5,844,843 A | 12/1998 | Matsubara et al. | |
| 5,901,330 A | 5/1999 | Sun et al. | |
| 5,940,074 A | 8/1999 | Britt, Jr. et al. | |
| 5,987,605 A | 11/1999 | Hill et al. | |
| 6,002,614 A * | 12/1999 | Banks | 365/189.01 |
| 6,009,495 A | 12/1999 | DeRoo et al. | |
| 6,009,540 A | 12/1999 | Craft et al. | |
| 6,073,207 A | 6/2000 | Ideta | |
| 6,079,016 A | 6/2000 | Park | |
| 6,131,159 A | 10/2000 | Hecht et al. | |
| 6,151,657 A | 11/2000 | Sun et al. | |
| 6,166,953 A | 12/2000 | Matsubara et al. | |
| 6,181,598 B1 | 1/2001 | Matsubara et al. | |
| 6,205,548 B1 | 3/2001 | Hasbun | |
| 6,223,284 B1 | 4/2001 | Novoa et al. | |
| 6,275,931 B1 | 8/2001 | Narayanaswamy et al. | |
| 6,282,605 B1 * | 8/2001 | Moore | 711/103 |
| 6,282,675 B1 | 8/2001 | Sun et al. | |
| 6,401,221 B1 | 6/2002 | Sun et al. | |
| 6,493,788 B1 | 12/2002 | Sun et al. | |
| 6,549,457 B1 * | 4/2003 | Srinivasan et al. | 365/185.03 |

* cited by examiner

| SECTOR 4 | | SECTOR 9 | |
|---|---|---|---|
| STATE | DEST SECT | STATE | DEST SECT |
| 90 | 91 | 92 | 93 |
| X0X1X1X1 | 11111111 | X0X0X0X0 | XXXXXXXX |
| X0X0X1X1 | 11111111 | X0X0X0X0 | XXXXXXXX |
| X0X0X1X1 | 11000011 | X0X0X0X0 | XXXXXXXX |
| X0X0X0X1 | 11000011 | X0X0X0X0 | XXXXXXXX |
| X0X0X0X1 | 11000011 | 11111111 | 11111111 |
| X0X0X0X1 | 11000011 | 11111111 | 11111111 |
| X0X0X0X1 | 11000011 | X0X1X1X1 | 11111111 |
| X0X0X0X0 | 11000011 | X0X1X1X1 | 11111111 |

SYSTEM AND METHOD FOR IMPROVING FLASH MEMORY DATA INTEGRITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to the use of flash memory for the storage of data. More particularly the invention relates to methods for erasing a flash memory, for writing data to a flash memory, and for reading data from a flash memory, all with improved data integrity.

A flash memory generally consists of a number of sectors of memory locations. The number of bytes of data in a sector and in the entire component varies greatly, depending on the particular flash memory component used. For example, a flash memory component may contain 2 megabytes (MB) of memory and it may be divided into 32 sectors, with each sector containing 64 kilobytes (KB) of memory. The most basic functions performed on a flash memory include writing data, reading data, and erasing data. Flash memory may only be erased an entire sector at a time. After a sector of flash memory is erased, the entire sector contains all binary ones. The flash memory may then be written or programmed by changing selected bits to a binary zero. Flash memory may generally be written or read a single byte at a time. The preferred embodiment of the present invention includes functions for erasing a sector of a flash memory component, as well as functions for allocating, writing, committing, reading, and freeing portions of a sector of a flash memory component. These portions of the flash memory will be referred to as "blocks of data."

Flash memory is generally very reliable and consistent, in that all bits of a sector are generally changed to a binary one upon erasure, and, after data has been programmed into a flash memory, it may be read back out accurately and consistently, over a long period of time. However, it is well known in the art that the data in a flash memory may be corrupted if power to the flash memory is disrupted while the memory is being erased or programmed. Power disruptions may occur for various reasons, such as a user intentionally or inadvertently shutting off the power to a device, a battery running out of energy, or a failure in the public alternating current power system. If a power disruption occurs during the erasure of a sector, the integrity of the data in the entire sector may be compromised. If a power disruption occurs while a portion of the flash memory is being written, any bit that was to be cleared to a binary zero during the write operation may or may not have been cleared. In addition, if a power disruption occurs while writing to an Intel StrataFlash™ memory, a bit that is adjacent to a bit that is being cleared may also be changed either from a binary one to a binary zero, or from a binary zero to a binary one. This is due to the technology of the StrataFlash™ memory, which enables the storage of two bits in a single memory cell. Thus, if a power disruption occurs while writing a zero to either bit of a StrataFlash™ memory cell, either one or both bits may be a binary zero or a binary one.

Many existing devices and systems that contain flash memory have little or no safeguards against the possibility of the data in the memory being corrupted upon power disruption. A system and method are needed for controlling, programming, and accessing a flash memory that will improve the reliability of the flash memory data, in the event of a power disruption during erase and program operations.

BRIEF SUMMARY OF THE INVENTION

The present invention comprises a method of reclaiming data from a first data sector of a flash memory to a second data sector of a flash memory in a manner that enables for a resumption of the reclaiming method in the event of a power interruption during the method. This first method comprises the steps of writing a first value to a sector state register for the first data sector to indicate that the first data sector is in a first reclaiming state, writing a second value to a destination sector register for the first data sector to indicate that the first data sector will be reclaimed to the second data sector, writing a third value to the sector state register for the first data sector to indicate that the first data sector is in a second reclaiming state, erasing the second data sector, copying valid data from the first data sector to the second data sector, writing a fourth value to the sector state register for the second data sector to indicate that the valid data from the first data sector has been successfully copied to the second data sector, and writing a fifth value to the sector state register for the first data sector to indicate that the first data sector has been successfully reclaimed to the second data sector. In this method, reclaiming from the first data sector to the second data sector is permissible, while reclaiming from the second data sector to the first data sector is not permissible.

In one embodiment of the invention, the sector state registers and the destination sector register reside in the flash memory. In another embodiment, each of the sector state registers and the destination sector register comprises a plurality of memory cells, and each memory cell has a plurality of bits, wherein writing to a first bit of a memory cell may affect one or more other bits in the memory cell in case of a power interruption, and only one bit is used in each of the plurality of memory cells of the sector state registers and the destination sector register. In another embodiment, the second value is an encoded sector number for the second data sector. In yet another embodiment, the encoded sector number is obtained by duplicating each bit of a binary sector number for the second data sector. In another embodiment, a possible reclaiming source is a permissible reclaiming source for a reclaiming destination if:

$$(RD - RS + NS) \% NS < NS/2$$

wherein RD is a sector number of the reclaiming destination, RS is a sector number of the possible reclaiming source, NS is a total number of data sectors in the flash memory, and "%" indicates a mathematical operation of dividing a first number by a second number and taking the remainder.

The present invention also comprises a method of maintaining a plurality of status bits in a flash memory component so that no more than one status bit may be corrupted at a time, wherein the flash memory component has a plurality of memory cells that each has a plurality of bits, and wherein writing to a first bit of a memory cell may affect one or more other bits in the memory cell in case of a power interruption. This second method comprises the steps of using a different memory cell for each status bit, selecting a first bit from a memory cell for use as the status bit for that memory cell and not using the rest of the plurality of bits in the memory cell, and writing each status bit in a different write operation. In more specific embodiments of this second method, the plurality of status bits may comprise a sector state register or a block state register. Also, the unused bits in a memory cell may be cleared to a binary zero or left at a binary one.

The present invention also comprises a method of encoding a sector number for storage in a destination sector register in a flash memory component, wherein the flash memory component comprises a plurality of memory cells that each has a plurality of bits, and wherein writing to a first bit in a memory cell may affect one or more other bits in the memory cell in case of a power interruption. This third method comprises the steps of representing the destination sector number in binary format and duplicating each bit of the binary representation of the destination sector number for storage in the destination sector register.

The present invention also comprises a method of maintaining a plurality of versions of a set of data in a plurality of data blocks in memory, each of said data blocks having a block version register. This fourth method comprises the steps of setting a global version register to an initial value, changing the value in the global version register each time a commit function is performed to commit written data blocks into memory, and copying the value from the global version register to the block version register for a data block, when the data block is written with data.

In one embodiment of this fourth method, the global version register is located in random access memory (RAM). In another embodiment, the global version register is initially cleared to zero and the value in the global version register is incremented each time a commit function is performed. In other embodiments, when power is turned on after a power interruption, a new value is determined for the global version register that is the highest value in a block version register for any written data block that has been committed into memory and this new value is written into the global version register. Then, any data block, that has a value in the block version register for that data block that is higher than the value in the global version register, may be marked to indicate that the data block has invalid data. Then, any data block, that has a value in the block version register for that data block that is the same as the value in the global version register, may be committed into memory. Then, any committed data block that has become obsolete may be marked to indicate that the data block has invalid data. Also, before the global version register is set to a value that is the highest value in a block version register for any written data block that has been committed into memory, the method may comprise the steps of determining whether a previous reclaiming operation was interrupted by the power interruption, and, if a previous reclaiming operation were interrupted by the power interruption, completing the interrupted reclaiming operation.

The present invention also comprises a system for managing data in a flash memory, the flash memory comprising a first plurality of data sectors, each of said first plurality of data sectors comprising a second plurality of data blocks. The system comprises a processor for executing one or more functions for managing the data in the flash memory, a reclaiming function for copying a plurality of valid data from a reclaiming source sector to a reclaiming destination sector and for erasing the reclaiming source sector, a first plurality of sector state registers for indicating a state for each of said first plurality of sectors, wherein a sector may be in a used state, a first reclaiming state, a second reclaiming state or a reclaimed state, and a destination block register for indicating a reclaiming destination sector to which a reclaiming source sector is being reclaimed during a reclaiming operation. In this embodiment, the reclaiming function sets the sector state register for a reclaiming source sector to indicate that the reclaiming source sector is in the first reclaiming state, then sets the destination block register to indicate a reclaiming destination sector, then sets the sector state register for the reclaiming source sector to indicate that the reclaiming source sector is in the second reclaiming state, then erases the reclaiming destination sector, then copies a plurality of valid data from the reclaiming source sector to the reclaiming destination sector, then sets the sector state register for the reclaiming destination sector to indicate that the reclaiming destination sector is in the used state, and then sets the sector state register for the reclaiming source sector to indicate that the reclaiming source sector is in the reclaimed state. Also, in this embodiment, permissible combinations of a reclaiming source sector and a reclaiming destination sector are mutually exclusive. Also, if power is interrupted during a reclaiming operation, the reclaiming operation may be resumed when power is supplied again.

In one embodiment of this system, the system comprises a first plurality of destination block registers for indicating a reclaiming destination sector to which each of said first plurality of sectors is being reclaimed when each of said first plurality of sectors is a reclaiming source sector in a reclaiming operation. In another embodiment of this system, a possible reclaiming source sector is a permissible reclaiming source sector for a reclaiming destination sector if:

$$(RD-RS+NS) \% NS < NS/2$$

wherein RD is a sector number of the reclaiming destination sector, RS is a sector number of the possible reclaiming source sector, NS is the number of data sectors in the first plurality of data sectors, and "%" indicates a mathematical operation of dividing a first number by a second number and taking the remainder.

BRIEF DESCRIPTION OF THE SEVERAL VIEWS OF THE DRAWING

FIG. 11 is a flowchart illustrating a method that is performed in a preferred embodiment of the present invention when a device or system, in which the present invention has been implemented, is powered on.

DETAILED DESCRIPTION OF THE INVENTION

Figure 1:
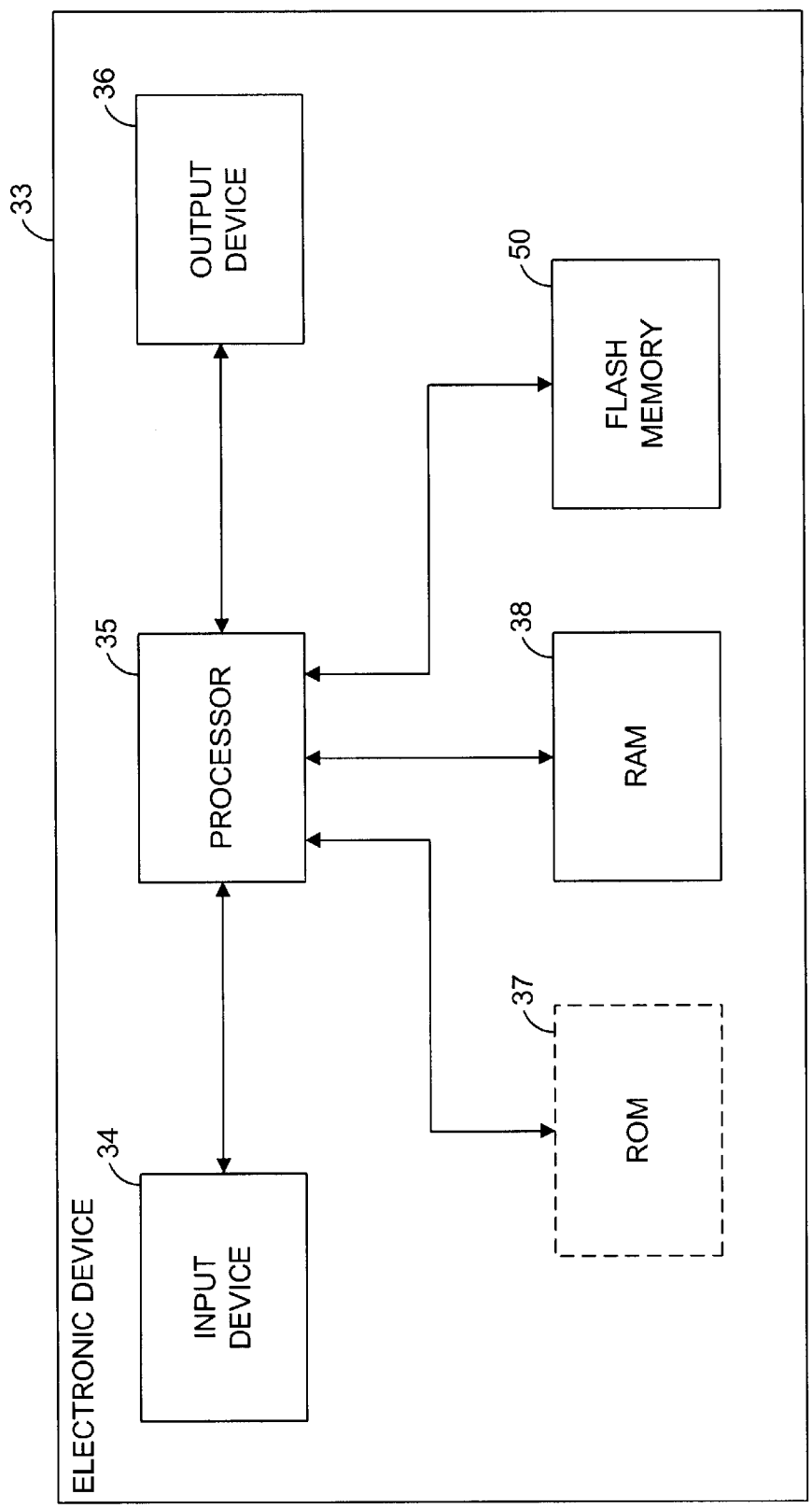
FIG. 1 is a block diagram of an electronic device in which the preferred embodiment of the present invention may be implemented.

FIG. 1 is a block diagram of an electronic device 33 in which the preferred embodiment of the present invention may be implemented. The present invention may be implemented in any electronic device having a processor and a flash memory component. The electronic device 33 may be, for example, a personal digital assistant (PDA). The electronic device 33 comprises an input device 34, a processor 35, an output device 36, an optional read-only memory (ROM) 37, a RAM 38, and a flash memory component 50. The input device 34 may be, for example, a plurality of input keys mounted on a surface of a PDA. The processor 35 may be, for example, an Intel 8086 compatible microprocessor, such as an Intel 8086 16-bit microprocessor. The output device 36 may be, for example, a liquid crystal display (LCD) panel. The RAM may be, for example, a 32 KB static RAM. The flash memory component 50 may be, for example, a 16 megabit flash memory component, such as an Advanced Micro Devices (AMD) AM29DL/164D simultaneous operation flash memory.

The methods of the present invention may be implemented in software that is stored in the flash memory 50 and executed by the processor 35. Alternatively, the software may be stored in the optional ROM 37. The flash memory 50 or the ROM 37 may also contain software for implementing an operating system (OS), one or more personal information management (PIM) functions, such as a calendar, a to-do list, and a contact list, and database management functions, which are also executed by the processor 35. A PIM application may receive user information from the input device 34, display user information on the output device 36, and store user information in the flash memory 50. The processor 35 may use the RAM 38 for temporary storage of data, as required by the OS, the PIM applications, the database management functions, and the software implementing the methods of the present invention.

Figure 2:
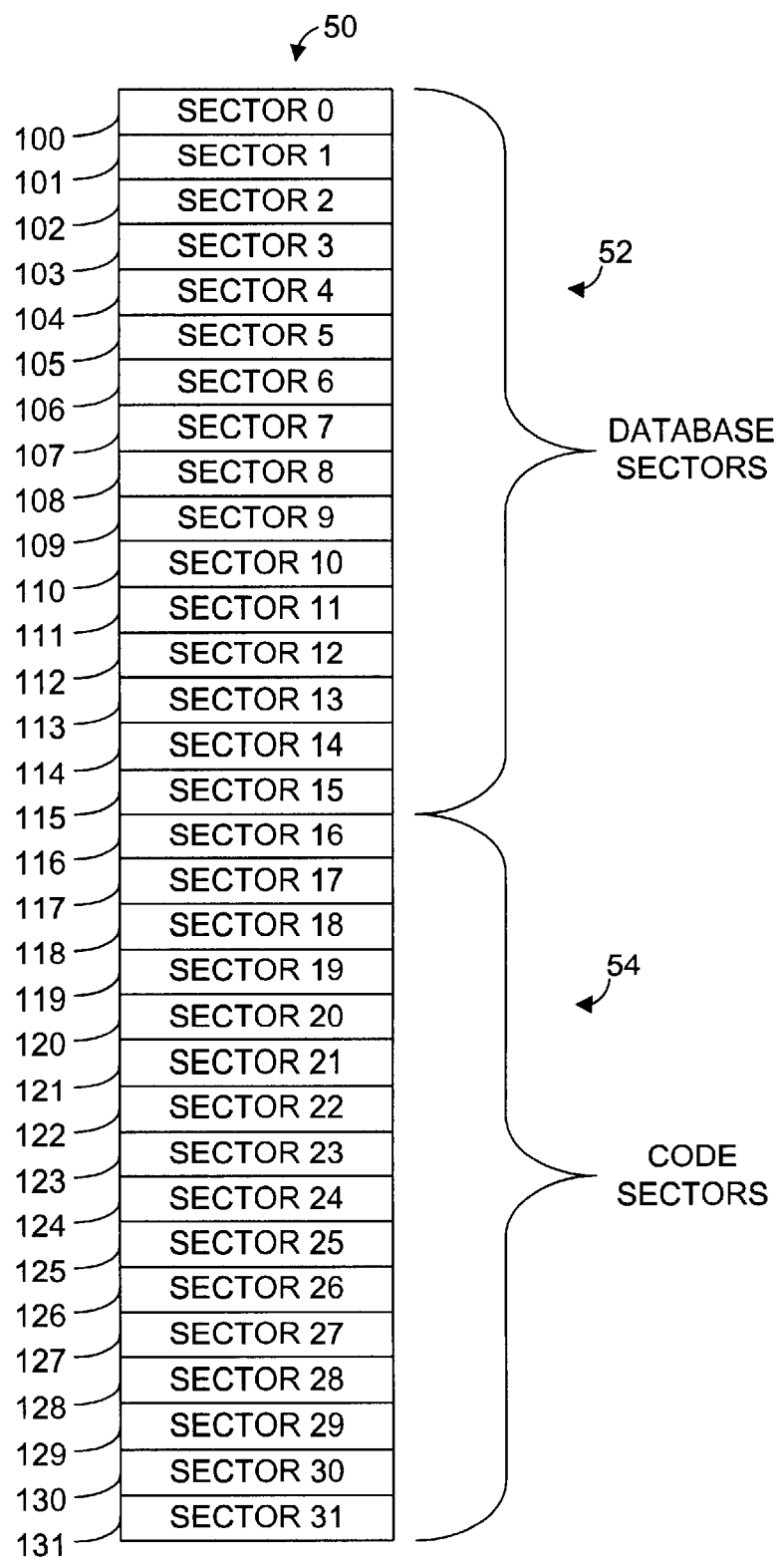
FIG. 2 is a diagram of a flash memory component having sixteen database sectors and sixteen code sectors.

FIG. 2 is a diagram of the flash memory component 50 of FIG. 1. The present invention may be implemented for use with any existing flash memory component or multiple flash memory components in any of a wide variety of electronic devices and equipment. The general operation and design requirements for using flash memories are well known to a person of skill in the art, and the requirements for a particular flash memory may generally be obtained from the manufacturer of the component. For example, a datasheet providing information related to the AMD AM29DL/164D simultaneous operation flash memory may be obtained from Advanced Micro Devices. Also, information on Intel's StrataFlash™ memories may be obtained from Intel Corporation, such as a datasheet related to the 3 Volt Intel® StrataFlash™ memory, part number 28F128J3A.

The flash memory 50 of FIG. 2 comprises thirty-two sectors 100 to 131. Each of these sectors 100 to 131 has a corresponding sector number 0 to 31, respectively. Thus, the sector 100 has a sector number 0, the sector 101 has a sector number 1, and so on. The sixteen sectors 0 to 15 comprise database sectors 52 for storage of database information, while the sixteen sectors 16 to 31 comprise code sectors 54 for storage of executable code. The flash memory component 50 may comprise 2 MB of memory and each sector 0 to 31 may comprise 64 KB of memory. The present invention will also work with flash memory components comprising any other number of storage locations, any other number of sectors, and any other size of sectors. The number of sectors used as database sectors and code sectors, respectively, may vary, and the particular sector numbers that are used as database sectors and code sectors may also vary. In addition, one or more sectors may be used for other purposes, besides the storage of database information and executable code.

Figure 3:
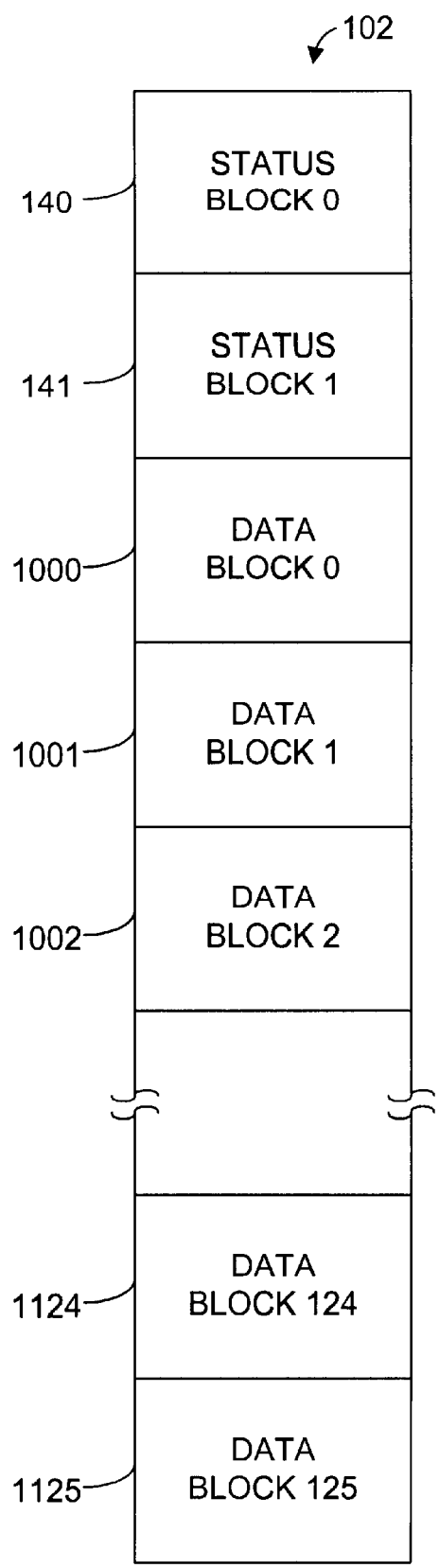
FIG. 3 is a more detailed diagram of one database sector of the flash memory component of FIG. 2.

FIG. 3 is a more detailed diagram of the sector 102 of FIG. 2. Sector 102 comprises 128 blocks 140, 141, and 1000 to 1125. Each block may comprise, for example, 512 bytes of data, or various other amounts of data. The first two blocks 140, 141 comprise status blocks 0 and 1 for storing status information about the sector 102 and the other blocks 1000 to 1125. The other 126 blocks 1000 to 1125 comprise data blocks 0 to 125 for storing actual user data. The other sectors 100, 101, and 103 to 131 (sectors 0, 1, and 3 to 31) have the same configuration as the sector 102. In other embodiments, each sector 100 to 131 may have a different number of blocks. Also, the status blocks 140 and 141 may have a different number of bytes than the data blocks 1000 to 1125. Various other configurations for the number and size of the sectors 100 to 131 and the blocks 140, 141, and 1000 to 1125 are also possible. Also, each of the sectors 0 to 31 for purposes of the present invention could comprise more than one erasable sector of an actual flash memory component. For example, if a flash memory component has 64 erasable sectors, it may be treated as having only 32 sectors for purposes of the present invention.

Figures 5, 6:
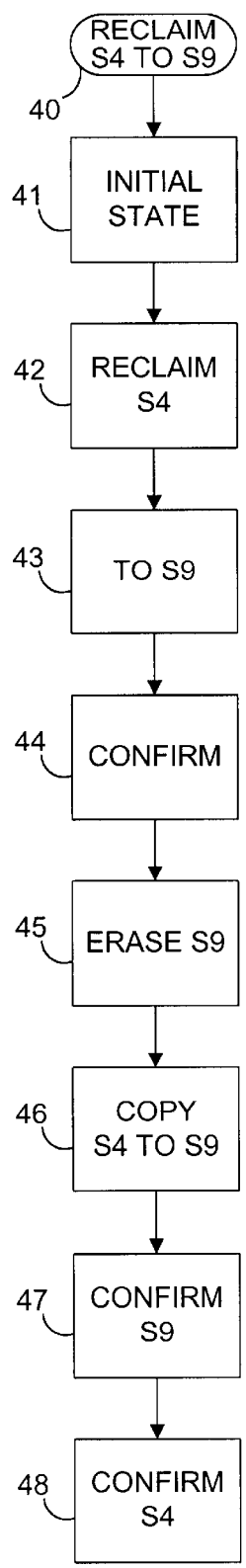
FIG. 5 is a flowchart illustrating a method for reclaiming data from a first sector of a flash memory (sector 4) to a second sector (sector 9) of the flash memory.
FIG. 6 is a table illustrating sector state values and destination sector values of sectors 4 and 9, for each of the steps of the method of FIG. 5.

In the preferred embodiment, the status blocks 140 and 141 contain status information for the sector 102 and for each of the data blocks 1000 to 1125. Specifically, the status blocks 140 and 141 contain at least eight bits of status information for the sector 102. These at least eight bits of status information will be referred to as a sector state register. A sector state register 90 for the sector 4 and a sector state register 92 for the sector 9 are depicted in FIG. 6. The status blocks 140 and 141 also contain a number of bits for storing an encoded sector number identifying a sector to which the sector 102 is to be reclaimed. These storage bits will be referred to as a destination sector register. For the preferred embodiment, with sixteen database sectors 52, the destination sector register comprises eight bits. A destination sector register 91 for the sector 4 and a destination sector register 93 for the sector 9 are depicted in FIG. 6.

The encoded sector number for storage in the destination sector register is obtained by taking the binary representation of the sector number and duplicating each bit. For example, the sector 109 has the sector number 9. Its binary representation is 0b1001, where "0b" denotes that the following characters represent a binary number. The encoded sector number is 0b11000011. The sector number can be derived from the encoded sector number by simply taking every other bit of the destination sector register. The bits of the sector number are duplicated for storage in the destination sector register so as to improve the reliability of flash memory data when using a StrataFlash™ memory. As described above, if power is disrupted to a StrataFlash™ memory while clearing a bit, the other bit in the same memory cell may also change. Suppose that the bits of the sector number were not duplicated as described above. In this case, if power were disrupted while a value of 0b1001 was being written to a destination sector register of a StrataFlash™ memory, the register might end up with a value such as 0b1010. Not only does the register contain the wrong value, but it can't even be reprogrammed to the correct value (without erasing the entire sector) because a bit that needs to be a binary one has been inadvertently cleared to a binary zero. In the encoding scheme described above, both bits of each memory cell of the destination sector byte are either cleared to a binary zero or left at a binary one. Thus, using this technique of duplicating the bits, if power were disrupted while a value of 0b11000011 were being written to a destination sector register of a StrataFlash™ memory, the register might end up with a value such as 0b11010011. Although the register still does not contain the correct value, it can at least be reprogrammed to the correct value. Other safeguards of the present invention, that will be described below, help to ensure that a corruption of data such as in this scenario will be detected, so that either the register may be reprogrammed to contain the correct value or other corrective action may be taken. Of course, to benefit from this safeguard relating to the duplication of bits in the destination sector register, the destination sector must be aligned in memory so that the duplicated bits are in the same memory cell.

In a similar manner and for the same reason, the sector state status bits also skip every other bit. In the preferred embodiment, the sector state value will contain 0bX0X1X1X1 when the database sector 52 is in use, 0bX0X0X1X1 when the database sector 52 is in a first reclaiming state, 0bX0X0X0X1 when the database sector 52 is in a second reclaiming state, and 0bX0X0X0X0 when the database sector 52 has been successfully reclaimed. These states will be described in greater detail below with reference to FIGS. 4 and 5.

The present invention may be implemented, for example, in a conventional database application, where a database management system (DBMS) accesses the flash memory 50 for storing user data in the database sectors 52. The DBMS may be separated into different layers as is well known in the art, including a block layer, a sector layer, a filesystem layer, and a storage layer. There are many books available that thoroughly describe various implementations of these layers. The preferred embodiment of the present invention implements the block layer and the sector layer of a DBMS. Existing filesystem layers and storage layers may be used with the block layer and the sector layer of the present invention with little or no modification. For example, the following references: *Operating Systems: Design and Implementation*, 2$^{nd}$ Edition, by Andrew S. Tanenbaum and Albert S. Woodhull, Prentice Hall, 1997 or *The Art of Computer Programming*, by Donald Ervin Knuth, Addison-Wesley Publishing Co., 1998, the disclosures of which are hereby incorporated by reference, for all purposes, may be used to design filesystem and storage layers that may be used along with the preferred embodiment of the present invention. The appropriate storage layer depends on the filesystem implemented, as it provides an interface to the filesystem layer. A person of skill in the art may also design a new filesystem layer and/or a new storage layer that will coordinate with the block layer and the sector layer of the present invention to implement a DBMS. The design and implementation of the filesystem layer and the storage layer may vary significantly from one implementation to another. The implementation that will be preferred for a particular embodiment of the present invention depends on various characteristics of the device or system in which the invention is implemented, including the type of database application and the size and type of user data to be stored. A person of skill in the art will understand how to decide on an implementation for the filesystem layer and the storage layer for a particular situation.

The present invention controls the erasing, programming, and reading of the database sectors 52. Erasing may only be performed on an entire sector. In the preferred embodiment, a database sector 52 is reclaimed before the sector is erased. Reclaiming will be understood by a person of skill in the art and will be described in greater detail below. At any given time, fifteen of the sixteen database sectors 52 are in use, while the remaining database sector 52 is available for a reclaiming operation, excluding times when a reclaiming operation is under progress. For example, assume that sectors 0 to 8 and 10 to 15 are in use, and sector 9 is available for a reclaiming operation. In a reclaiming operation, valid data in a first database sector 52 ("the reclaiming source") is copied to a second database sector 52 ("the reclaiming destination"). The reclaiming source may then be erased without losing any data. Any subsequent accesses to the data that was stored in the first sector will then access the data from the second sector.

One aspect of the present invention involves imposing limitations on which combinations between reclaiming sources and reclaiming destinations are allowed. For a specific database sector 52 that is available to be a reclaiming destination, only selected ones of the other database sectors 52 are allowed to be used as a reclaiming source. For example, if sector 9 is available to be a reclaiming destination, sector 4 may be a permissible reclaiming source, but reclaiming data from sector 12 may not be permitted. These limitations on allowable reclaiming combinations form a part of the safeguards that enhance the integrity of the data stored in the flash memory 50. Although a specific set of limitations is disclosed herein, many other sets of limitations would also work in the present invention. A person of skill in the art will easily be able to devise other sets of limitations that will satisfy the requirements of the present invention.

Figure 4:
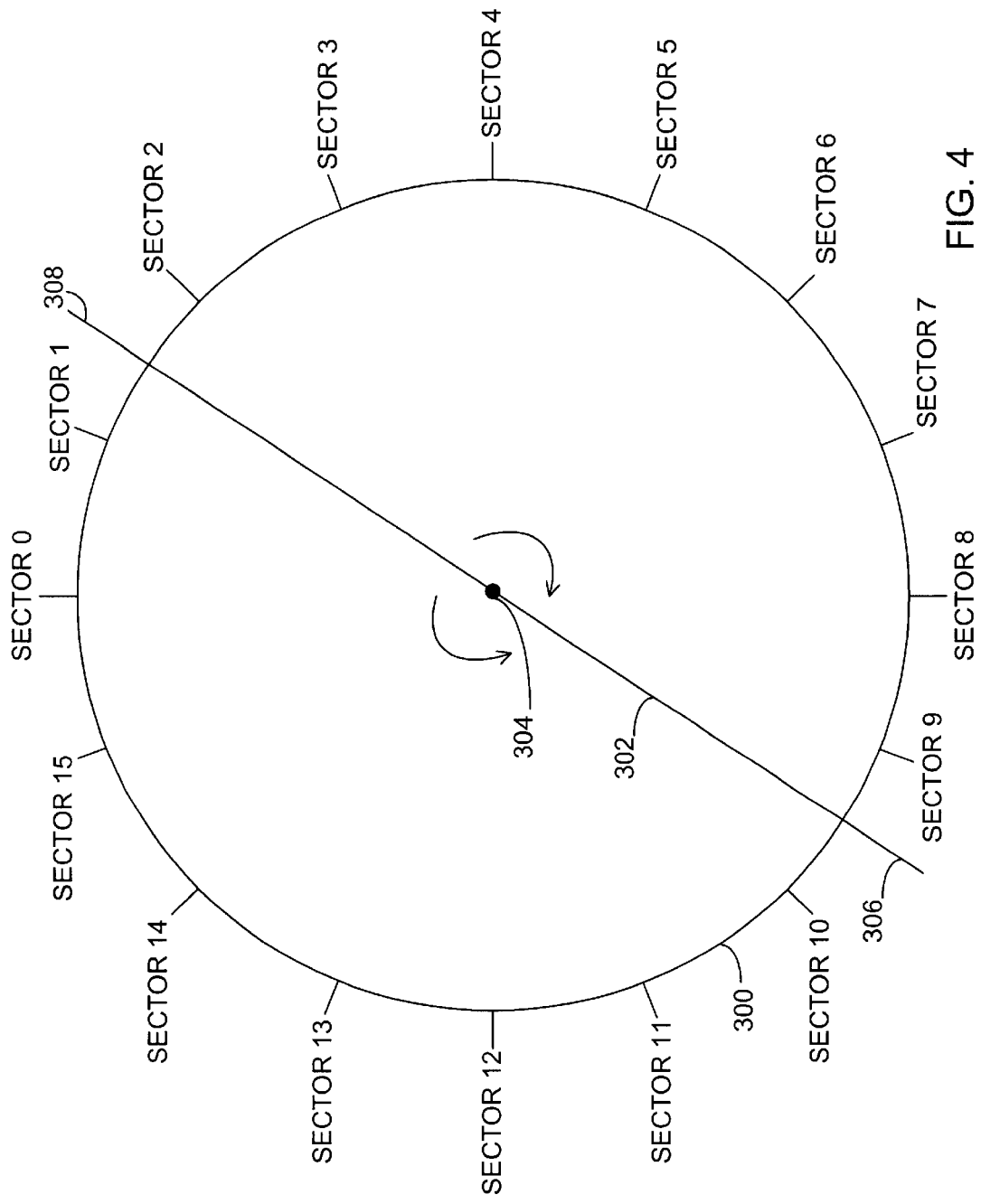
FIG. 4 is a diagram illustrating permissible reclaiming operations under one embodiment of the present invention for a flash memory component having sixteen database sectors.

FIG. 4 illustrates the possible reclaiming operations that are permissible under one embodiment of the present invention. FIG. 4 shows a circle 300, a center point 304, and a line 302 bisecting the circle 300 and extending through the center point 304 beyond the perimeter of the circle 300 on each side. A first end 306 of the line 302 extends beyond the perimeter of the circle 300 at one point, and a second end 308 of the line 302 extends beyond the perimeter of the circle 300 at an opposing point. FIG. 4 also shows sectors 0 through 15 arranged at equidistant positions around the perimeter of the circle 300, in numerical order, with the numbers increasing in a clockwise direction. The line 302 may be rotated in a clockwise direction or in a counterclockwise direction about the center point 304. As illustrated in FIG. 4, the current position of the line 302 is such that the first end 306 of the line 302 is between sectors 9 and 10 and the second end 308 of the line 302 is between sectors 1 and 2. In other terms, sector 9 is proximate to the first end 306 of the line 302 in a counterclockwise direction and sector 1 is proximate to the second end 308 of the line 302 in a counterclockwise direction. Conversely, the first end 306 of the line 302 is proximate to sector 9 in a clockwise direction and the second end 308 of the line 302 is proximate to sector 1 in a clockwise direction.

When an end 306 or 308 of the line 302 is between a first sector and a second sector, the configuration of FIG. 4 will illustrate the sectors that may be reclaimed to the sectors that are proximate to the ends 306 and 308, in a counterclockwise direction. In other words, the configuration of FIG. 4 illustrates the possible reclaiming operations that are permissible, where the reclaiming destination is the sector that is proximate to an end 306 or 308, in a counterclockwise direction. Specifically, when the line 302 is rotated so that a reclaiming destination is proximate to an end 306 or 308, in a counterclockwise direction, then all of the sectors that are on the same side of the line 302 as the reclaiming destination are permissible reclaiming sources. As illustrated in FIG. 4, sector 9 is proximate to the end 306, in a counterclockwise direction. Thus, all of the sectors that are on the same side of the line 302 as sector 9 may be reclaimed to sector 9. Specifically, any one of the sectors 2 through 8 may be reclaimed to sector 9. In contrast, sector 14 may not be reclaimed to sector 9 because sector 14 is on the opposite side of the line 302 from sector 9. In addition, sector 1 is proximate to the end 308, in a counterclockwise direction. Thus, FIG. 4 also shows that any one of the sectors 0 and 10 through 15 may be reclaimed to sector 1. The configuration of FIG. 4 may be used to determine permissible reclaiming sources for any reclaiming destination by rotating the line 302 so that an end 306 or 308 of the line 302 is proximate to the reclaiming destination, in a clockwise direction.

The configuration of FIG. 4 may be adapted for use with other embodiments involving a different number of database sectors 52. Whatever number of sectors a particular embodiment may have, the sector numbers are distributed at equidistant positions about the perimeter of the circle 300, in numerical order, and the line 302 is used in a similar manner. Various other modifications may also be made. For example, the configuration of FIG. 4 may also be used so that the line 302 is rotated so that an end 306 or 308 of the line 302 is proximate to a reclaiming destination in a counterclockwise direction, and the permissible reclaiming sources include all other sectors on the same side of the line 302 as the reclaiming destination. Modifications in the permissible reclaiming combinations will affect other aspects of the invention in a straightforward manner.

The permissible reclaiming sources for a particular reclaiming destination may also be expressed as a mathematical equation. If you take the sector number of the reclaiming destination, subtract the sector number of a possible reclaiming source, add the total number of sectors, divide the result of these operations by the total number of sectors and take the remainder of this division, then the possible reclaiming source is permissible if the remainder is less than the total number of sectors divided by two. In other words, a reclaiming source is permissible if:

$$(RD-RS+NS) \% NS < NS/2$$

where RD is the sector number of the reclaiming destination, RS is the sector number of the possible reclaiming source, NS is the total number of data sectors, and "%" indicates a mathematical operation of dividing a first number by a second number and taking the remainder. Thus, for example, assume that sector 9 is the reclaiming destination, sector 4 is a possible reclaiming source and the total number of database sectors 52 is sixteen. Applying the equation defined above, (9−4+16) % 16=5, which is less than 16/2=8, so sector 4 is a permissible reclaiming source for sector 9. On the other hand, assume that sector 9 is the reclaiming destination, sector 12 is a possible reclaiming source and the total number of database sectors 52 is sixteen. Again applying the equation defined above, (9−12+16) % 16=13, which is not less than 16/2=8, so sector 12 is not a permissible reclaiming source for sector 9. Modifications may also be made to this equation to derive other, equally effective limitations on reclaiming combinations.

The preferred embodiment of the present invention provides a sector layer function for reclaiming data from a reclaiming source to a reclaiming destination. This reclaiming function may be called by a filesystem layer, a storage layer or other higher-level application programs. The calling routine will preferably specify the reclaiming source and the reclaiming destination. The calling routine should specify a reclaiming destination that has no valid data, such as a database sector 52 that has just been a reclaiming source in a prior reclaiming operation. The calling routine should specify a permissible reclaiming source relative to the specified reclaiming destination, as described above with reference to FIG. 4. In the preferred embodiment of the present invention, the sector layer reclaiming function will perform an error detection function prior to beginning a requested reclaiming operation to verify that the specified reclaiming source is permissible relative to the specified reclaiming destination.

In the preferred embodiment, as described above, fifteen of the sixteen database sectors 52 will be in use at a given time, and the other sector will be available to be a reclaiming destination. Typically, there will be a higher-level function that will keep track of which sectors are in use and which are available for reclaiming. Based on which of the sixteen database sectors 52 are available for reclaiming, this function will determine which seven of the other fifteen database sectors 52 are permissible reclaiming sources, as described above with reference to FIG. 4. Then the higher-level function may select one of the seven permissible database sectors 52 to be a reclaiming source, based on various criteria. For example, the higher-level function may select the permissible reclaiming source that has the largest number of "dirty" blocks, as described in further detail below. The higher-level function will then call the sector layer reclaiming function, specifying the selected reclaiming source and the available reclaiming destination.

FIG. 5 is a flowchart illustrating a method performed by the sector layer reclaiming function of the preferred embodiment of the present invention, when the reclaiming function is called to reclaim data from a first database sector 52 to a second database sector 52. Specifically, the example of FIG. 5 illustrates a reclaiming operation from a reclaiming source of sector 4 to a reclaiming destination of sector 9. FIG. 6 is a table showing the contents of the sector state register 90 of sector 4, the destination sector register 91 of sector 4, the sector state register 92 of sector 9, and the destination sector register 93 of sector 9, for each of the steps of the method of FIG. 5. Specifically, each of the rows of the table of FIG. 6 gives the values for these registers for a corresponding step of the method of FIG. 5 that is at the same horizontal position on the sheet as the row of the table of FIG. 6. For example, at a step 41, the sector state register 90 of sector 4 contains the value 0bX0X1X1X1, the destination sector register 91 of sector 4 contains the value 0b11111111, the sector state register 92 of sector 9 contains the value 0bX0X0X0X0, and the destination sector register 93 of sector 9 contains an unknown value, which is denoted as "XXXXXXXX."

The method of FIG. 5 begins at a step 40. The step 41 shows the initial state of the sector state and destination sector registers of sectors 4 and 9. When the reclaiming function is called, sector 4 is in use, while sector 9 has just been reclaimed to another database sector 52. Thus, the sector state register 90 of sector 4 contains 0bX0X1X1X1 and the sector state register 92 of sector 9 contains 0bX0X0X0X0. The destination sector register 91 of sector 4 contains 0b11111111 because the memory location has not been programmed since the last time sector 4 was erased. The destination sector register 93 of sector 9 contains the encoded sector number for the sector to which sector 9 was previously reclaimed. This encoded sector number is not relevant to the current reclaiming operation.

At a step 42, the reclaiming function writes the value 0bX0X0X1X1 into the sector state register 90 of sector 4 to indicate that sector 4 will be reclaimed, as the next reclaiming source. At this point, after the new value has been successfully written into the sector state register 90 of sector 4, sector 4 is in the first reclaiming state. At a step 43, the reclaiming function writes the value 0b11000011 (the encoded sector number for sector 9) to the destination sector register 91 of sector 4 to indicate that sector 4 will be reclaimed to sector 9. At a step 44, the reclaiming function writes the value 0bX0X0X0X1 into the sector state register 90 of sector 4 to indicate that the destination sector register 91 has been successfully programmed with the encoded section number of the section to which sector 4 is to be reclaimed. At this point, after the new value has been successfully written into the sector state register 90 of sector 4, sector 4 is in the second reclaiming state.

At a step 45, the reclaiming function erases all of sector 9. As described above, erasing a sector of a flash memory changes all of the bits of the sector to binary ones. Thus, the sector state register 92 and the destination sector register 93 of sector 9 contain all binary ones.

At a step 46, the reclaiming function copies all valid data from sector 4 to sector 9. Valid data is any data that has not been marked as "dirty," as described below. Dirty blocks are not copied over to sector 9, so that the corresponding blocks of sector 9 remain erased, so that they can be used for other purposes.

At a step 47, the reclaiming function writes the value 0bX0X1X1X1 into the sector state register 92 of sector 9 to indicate that the valid data has been successfully copied from sector 4 to sector 9, and that sector 9 is now available for use. Any subsequent memory writes or reads related to the data that was stored in sector 4 will now be directed to the corresponding data stored in sector 9. At a step 48, the reclaiming function writes the value 0bX0X0X0X0 to the sector state register 90 of sector 4 to indicate that the valid data of sector 4 has been successfully reclaimed. This concludes the reclaiming method of FIG. 5. Note that sector 4 is now available as a reclaiming destination for a subsequent reclaiming operation.

The reclaiming function of the preferred embodiment of the present invention is described as a sector layer function because it operates on an entire database sector 52. The preferred embodiment also provides block layer functions that operate on individual data blocks 1000 to 1125. In particular, the preferred embodiment of the present invention provides functions for freeing a data block, writing data to a data block, committing changes, backing out uncommitted changes, reading a data block in its current state, and reading a data block as it was at the last commit.

As mentioned above, the status blocks 140 and 141 contain status information regarding each of the data blocks 1000 to 1125, in addition to the status information related to the database sector 52 as a whole. In particular, the status blocks 140 and 141 contain a block state register 94, a block label register 96, and a block version register 98 for each of the data blocks 1000 to 1125. In the preferred embodiment, the block state register 94 comprises one byte. The block version register 98 preferably comprises four bytes, although various other data sizes would also work, and the block label register 96 preferably comprises two bytes, although, again, various other data sizes would also work.

When a database sector 52 is reclaimed as described above, every location of every block 140,141, and 1000 to 1125 is erased to all binary ones. Then, the data blocks 1000 to 1125 of the reclaiming source that contain valid data are copied on a one-to-one basis to data blocks 1000 to 1125 of the reclaiming destination. For each of the data blocks 1000 to 1125 that is copied from the reclaiming source to the reclaiming destination, the corresponding block state, block label, and block version values are copied from the status blocks 140 and 141 of the reclaiming source to the status blocks 140 and 141 of the reclaiming destination. Each of the data blocks 1000 to 1125 of the reclaiming destination for which there was no valid data in the reclaiming source is not changed from its erased state of having all binary ones, and the corresponding sector state, sector number, and sector version values in the status blocks 140 and 141 are not changed from their erased state. Thus, these data blocks 1000 to 1125 and their corresponding status registers are available for various uses. After the valid data is copied from the reclaiming source to the reclaiming destination, the sector state register for the database sector 52 is then set to bX0X1X1X1 to indicate that the sector is in use. Now, higher-level applications may call block-level functions to use the data blocks 1000 to 1125 of the reclaiming destination sector.

Figures 7, 8:
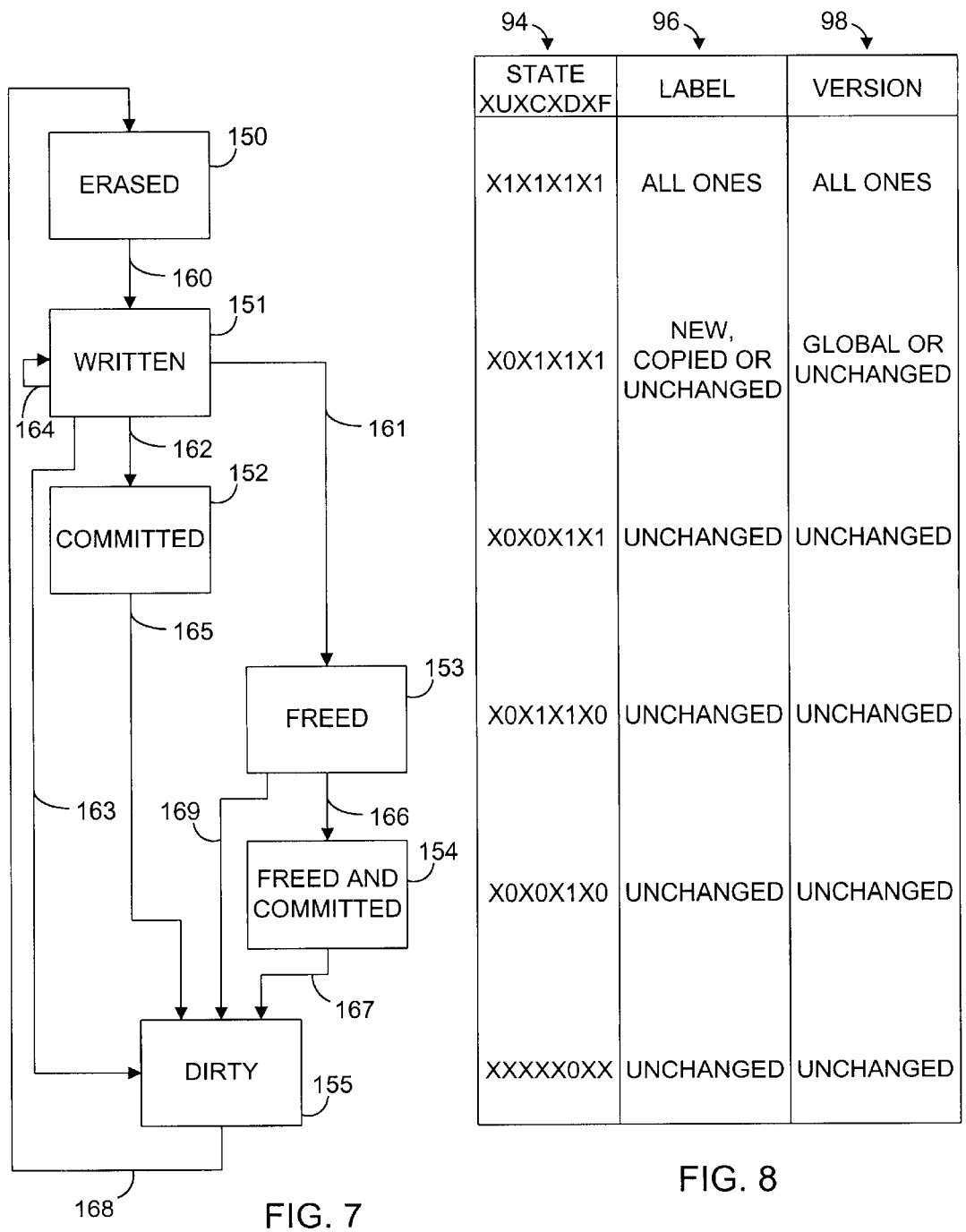
FIG. 7 is a state diagram illustrating the various states that a block of data may assume in response to various operations.
FIG. 8 is a table illustrating the block state values, the block label values, and the block version values for each of the states depicted in FIG. 7.

FIG. 7 illustrates various states that a data block 1000 to 1125 may assume in response to various block-level operations. FIG. 8 shows the values of the block state register 94, the block label register 96, and the block version register 98 for the data block 1000 to 1125 during each of the various states illustrated in FIG. 7. The correlation between FIGS. 6 and 7 is similar to the correlation between FIGS. 4 and 5. The block state register 94 comprises eight bits. Starting from the left of the block state register 94, the first, third, fifth, and seventh bits are unused, as illustrated in FIG. 8. These bits may be left at a binary one, or they may be cleared to a binary zero. The block state register 94 includes these unused bits to improve data integrity for the StrataFlash™ memory. In addition, only one used bit of the block state register 94 is cleared at a time to further enhance data integrity. The second bit from the left ("the used bit") in the block state register 94 is cleared to a binary zero to indicate that the data block 1000 to 1125 is in use. The fourth bit from the left ("the commit bit") is cleared to a binary zero to indicate that the data block 1000 to 1125 has been committed. The sixth bit from the left ("the dirty bit") is cleared to a binary zero to indicate that the data block 1000 to 1125 is "dirty." A data block 1000 to 1125 is marked as dirty when its data is no longer valid. The eighth bit from the left ("the free bit") is cleared to a binary zero to indicate that the data block 1000 to 1125 has been freed.

In FIG. 7, a box 150 illustrates an erased state of a data block 1000 to 1125, in which the data block 1000 to 1125 has not been written since it was erased to all binary ones. A box 151 illustrates a written state of a data block 1000 to 1125, in which the data block 1000 to 1125 has been written or programmed with data and has not been committed, freed, or dirtied. A box 152 illustrates a committed state of a data block 1000 to 1125, where the data block 1000 to 1125 has had its contents committed into memory and it is not yet dirty. A box 153 illustrates a freed state of a data block 1000 to 1125, where the data block 1000 to 1125 has been freed from use, but has not yet been committed or dirtied. A box 154 illustrates a freed and committed state of a data block 1000 to 1125, where the data block 1000 to 1125 has been freed and committed, but not yet dirtied. A box 155 illustrates a dirty state of a data block 1000 to 1125, where the data block 1000 to 1125 has been identified as being "dirty."

A data block will be in the erased state of box 150 after the database sector 52 has been erased, such as during a reclaiming operation. If valid data from the reclaiming source is not copied into the particular data block of the reclaiming destination during the reclaiming operation, then the data block will remain in the erased state of box 150 after the reclaiming operation and will be available for some other use. As shown in FIG. 8, the block state register 94, the block label register 96, and the block version register 98 each contains all binary ones.

An erased data block may be written or programmed to contain specific data in response to a call from a higher-level application to a block-level write function. In this case, a line 160 in FIG. 7 illustrates a transition of the data block from the erased state of box 150 to the written state of box 151. When a data block transitions to the written state of box 151, the block-level write function clears the used bit of the block state register 94 to a binary zero as illustrated in FIG. 8.

An erased data block may transition to a written state under at least two scenarios. First, a higher-level application may call the block-level write function and specify a new set of data to be written into an erased data block 1000 to 1125. For example, an address book application may write a person's home telephone number into memory, where the person's home telephone number had not previously been entered into memory. In this case, the block-level write function will select a first erased data block, write the person's telephone number to that first data block, select a new two-byte block label value for the first data block, write the block label value into the block label register 96 of the first data block, and return the block label value to the address book application. The step of writing the new block label value into the block label register 96 is illustrated in FIG. 8 by the "new" entry in the block label column 96 at box 151. The same block label value may be used in subsequent block-level function calls to specify that the called function is to operate on the first data block, which contains that person's home telephone number.

Now suppose that the address book application wants to change the value of the same person's home telephone number in memory. The address book application will again call the block-level write function with the changed telephone number. This time, however, the address book application sends the same block label value that was returned after the earlier block-write function call, along with the current block-write function call. This indicates to the block-level write function that the changed telephone number is to be written into the same data block as the previous telephone number, i.e., the first data block. The block-level write function will find the first data block, which contains the supplied block label value in its block label register 96. The block-level write function will then determine if it is possible to write the changed telephone number into the first data block. This write may not be possible, for example, if it would require that one or more bits of the first data block be changed from a binary zero to a binary one when writing the changed telephone number. As described above, changing a bit from a binary zero to a binary one is not possible without erasing the entire sector 100 to 131. If the write is not possible, the block-level write function will write the changed telephone number to a second data block that is in the erased state of box 150. This is the second scenario in which an erased data block may transition to a written state. In this scenario, the block-level write function will copy the block label value from the block label register 96 of the first data block to the block label register 96 of the second data block. This step of copying the block label value from the first data block into the block label register 96 of the second data block is illustrated in FIG. 8 by the "copied" entry in the block label column 96 at box 151. Subsequent accesses to that person's telephone number will now be directed to the second data block, instead of the first data block.

In any case, when a data block 1000 to 1125 transitions from the erased state of box 150 to the written state of box 151, the block-level write function will copy a global block version number into the block version register 98 for the data block as illustrated in FIG. 8 by the "global" entry. A 32-bit counter, that may be located in the RAM 38 or in one or more internal registers of the microprocessor 35, for example, is used to maintain the global block version number. The global block version number is initially set to all binary zeroes. The global block version number is then incremented each time a block layer commit function is called. The global block version number is also set to a specific and appropriate value when the device or system is booted up after it has been powered down, as will be described in greater detail below.

In the example described above, if writing the changed telephone number to the first data block is possible, then the block-level write function simply writes the data supplied by the address book application into the first data block and leaves the block state register 94, the block label register 96, and the block version register 98 unchanged. This situation is illustrated in FIG. 7 by a line 164. The first data block remains in the written state of box 151, without transitioning to another state.

In the example described above, if the changed telephone number cannot be written to the first data block and is instead written to the second data block, the block-level write function also causes the first data block to transition from the written state of box 151 to the dirty state of box 155, as indicated by a line 163 in FIG. 7. A data block may also transition from the written state of box 151 to the dirty state of box 155 under other circumstances, such as when the integrity of the data in the data block is questionable during a device or system boot up, or when a block-level function is called to back out of uncommitted changes. The preferred embodiment of the present invention implements such a block-level function for backing out of uncommitted changes. When this function is called, it causes every data block that is in the written state of box 151 to transition to the dirty state of box 155.

If a higher-level function calls a block-commit function, all data blocks that are in the written state of box 151 will transition to the committed state of box 152, as shown by line 162 in FIG. 7. A higher-level function may alternatively free a data block that is in the written state of box 151 by calling a free block function. In this case, the data block will transition from the written state of box 151 to the freed state of box 153, as shown by a line 161 in FIG. 7.

As is well known in the art, a block-level commit function may be used in a database system to give a user more flexibility in entering data. If a user selects a particular data item for modification, the database system may provide the current values for that particular data item to the user on a display device. The user may then make changes to those values. However, the database system does not immediately change the permanently stored values (or committed values) for that data item. Instead, the database system writes the changed values to a different data block. After a user has finished making changes to the values of the data item, the database system will typically prompt the user to ensure that the user indeed wants to commit the new changes into the database. Once a user confirms its intent to commit the new changes into the database, the higher-level functions of the database system will call the block-commit function to commit all written, but uncommitted, data blocks.

When a block-level commit function causes all of the data blocks that are in the written state of box 151 to transition to the committed state of box 152, the commit function clears the commit bit of the block state register 94 for each of those data blocks, as shown in FIG. 8. The commit function leaves the block label register 96 and the block version register 98 unchanged.

A higher-level function may attempt to free a first data block that is in the committed state of box 152 by calling a block-level free function. However, in the preferred embodiment of the present invention, a committed data block cannot be freed. Instead, the block-level free function copies the data from the first data block into a second data block that is in the erased state of box 150, copies the block label value from the block label register 96 of the first data block into the block label register 96 of the second data block, writes the global version value into the block version register 98 of the second data block, clears the used bit of the second data block to cause the data block to transition to the written state of box 151, and clears the free bit of the second data block to cause the second data block to transition to the freed state of box 153, as shown by the line 161. This aspect of the preferred embodiment allows for the freeing of the data block to be reversed. While the second data block is in the freed state of box 153, a higher-level function may call a function to back out of all uncommitted changes. In this case, the second data block would be marked dirty, but the first data block would still be in the committed state of box 152.

A data block in the committed state of box 152 may become obsolete. When a data block is obsolete, it will be marked as dirty. This situation may arise, for example, when a user makes changes to previously committed values of a data item and then confirms that the new changes are to be committed into the database, as described above. In this case, after the new changes have been committed into the database, the database will contain multiple committed versions of the same data item in different data blocks. The multiple committed versions in the different data blocks will all have the same value in their respective block label registers 96. However, the multiple committed versions in the different data blocks can be distinguished because they will have different block version numbers in their block version registers 98. The data block with the largest block version number contains the most recently committed changes to the data item. Any data blocks with smaller block version numbers are considered obsolete. Thus, when a user commits changes to a data item that had previously been committed, the commit block function causes the data block containing the newly committed changes to transition from the written state of box 151 to the committed state of box 152, and it causes the data block containing the previously committed version of the data item to transition from the committed state of box 152 to the dirty state of box 155, as shown by a line 165 in FIG. 7. The commit block function can determine that a data block has become obsolete by determining that the data block has been committed by checking the commit bit in the block state register 94 and finding another data block that has also been committed and that has the same block label value, but a larger (i.e., more recent) block version value.

A written data block of box 151 may be freed by a higher-level function by calling the free block function. And, as described above, a higher-level function may call the free block function and specify a data block that is in the committed state of box 152, which will cause a different data block to transition from the erased state of box 150 to the written state of box 151, and then to the freed state of box 153. In either case, a data block will transition from the written state of box 151 to the freed state of box 153, as shown by the line 161, when the free block function clears the free bit of the data block's block state register 94, as shown in FIG. 8. The free block function leaves the other bits of the block state register 94 unchanged. The free block function also leaves the block label register 96 and the block version register 98 unchanged.

A data block that is in the freed state of box 153 may transition to the dirty state of box 155 as shown by the line 169 of FIG. 7. The block-level function for backing out of uncommitted changes will clear the dirty bit of the block state register 94 of every data block that is in the freed state of box 153, and cause those data blocks to transition to the dirty state of box 155. A data block that is in the freed state of box 153 may alternatively transition to the freed and committed state of box 154. When the block-level commit function is called, this function commits all data blocks that are in the freed state of box 153 by clearing the commit bit of the block state register 94, as shown in FIG. 8. The block-level commit function will leave the block label register 96 and the block version register 98 unchanged. During the same block-commit operation, data blocks that have transitioned to the freed and committed state of box 154 will also transition to the dirty state of box 155, as shown by the line 167 in FIG. 7. The transition from the freed state of box 153 to the freed and committed state of box 154 occurs at a step 71 of FIG. 10, while the transition from the freed and committed state of box 154 to the dirty state of box 155 occurs at a step 73 of FIG. 10.

A data block may transition to the dirty state of box 155 from the written state of box 151, from the committed state of box 152, from the freed state of box 153, or from the freed and committed state of box 154. As described above, a data block may transition from the written state of box 151 to the dirty state of box 155, for example, if a higher-level function attempts to perform an impossible write to the data block. A data block may transition from the committed state of box 152 to the dirty state of box 155 if the committed data block becomes obsolete. A data block will transition from the freed state of box 153 to the dirty state of box 155 if the block-level function for backing out of uncommitted changes is called before the block-level commit function is called. A data block will always transition from the freed and committed state of box 154 to the dirty state of box 155 when a block-level commit function is called. In any case, when a data block transitions to the dirty state of box 155, the dirty bit of the block state register 94 is cleared. All the other bits of the block state register 94 remained unchanged. Thus, the commit bit and the free bit of the block state register 94 may or may not be cleared, depending on whether the data block had been committed or freed prior to its transition to the dirty state of box 155. Also, the block label registers 96 and the block version registers 98 remain unchanged.

A data block that is in the dirty state of box 155 will be erased the next time its database sector 52 is a reclaiming destination in a sector-level reclaiming operation. In this case, the data block will transition from the dirty state of box 155 to the erased state of box 150, as shown by a line 168 in FIG. 7. The erasure of the entire database sector 52 causes the block state registers 94, the block label registers 96, and the block version registers 98 to be reset to all binary ones, as shown in FIG. 8.

Figure 9:
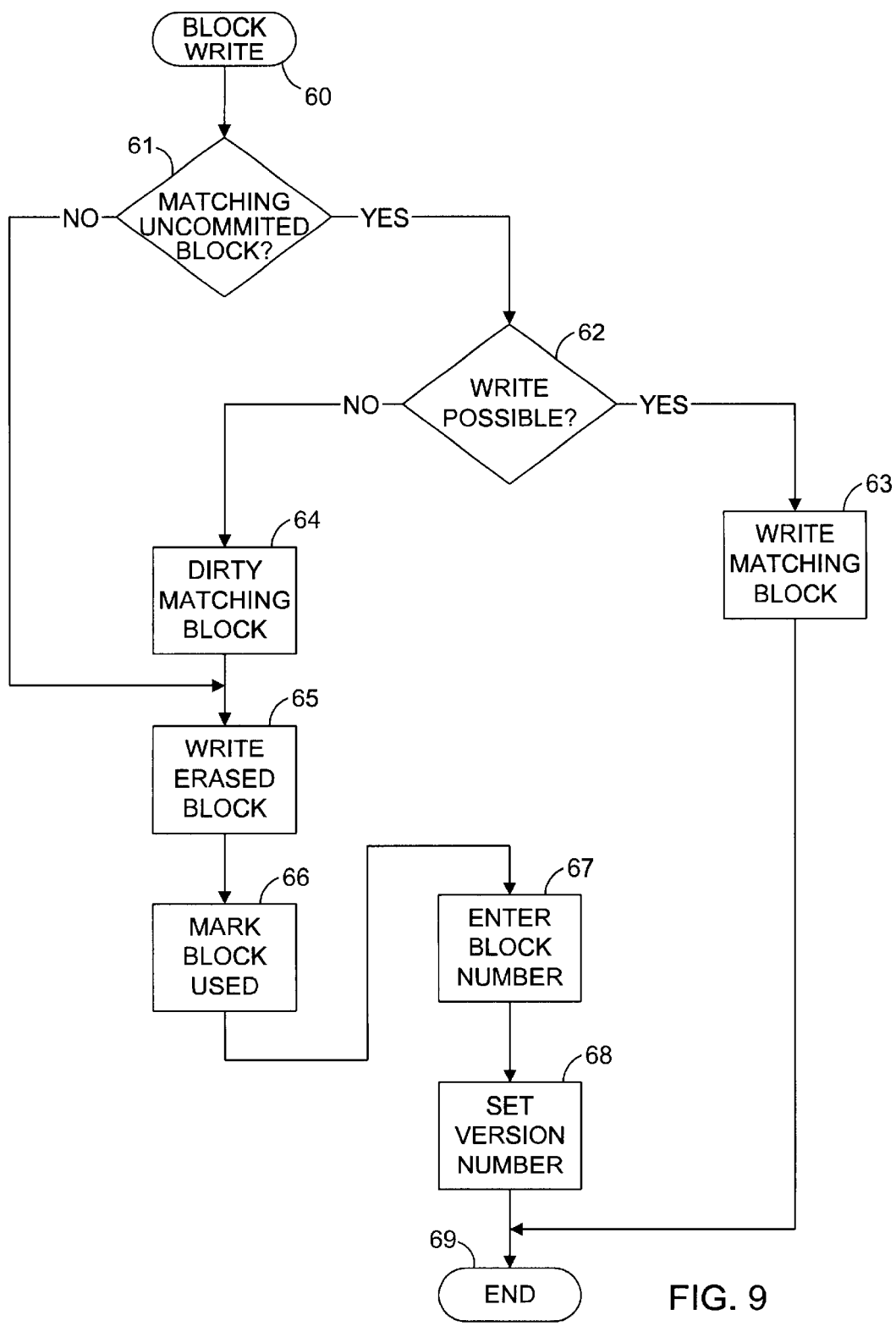
FIG. 9 is a flowchart illustrating a method for writing a block of data to a flash memory.

FIG. 9 is a flowchart illustrating a method for performing a block-level write operation. A higher-level function may call a block-level write function to initiate this method. The method begins at an initial step 60 and proceeds to a decision step 61. The higher-level function may specify a block label for a data block 1000 to 1125 on which the write function is to be performed. In this case, the block-write function searches for a data block 1000 to 1125 that has the block label specified by the higher-level function and that is in the written state of box 151 of FIG. 7. In other words, the block-write function searches for a data block that is in the written state of box 151 of FIG. 7 that has a value in its block label register 96 that matches the block label specified by the higher-level function in its call to the block-write function. A data block is determined to be in the written state of box 151 if its used bit is cleared to a binary zero, its commit bit, dirty bit, and free bit remain at a binary one, and its block version register 98 has been set to a specific value, other than all binary ones. If the block-write function finds such a matching data block, the method of FIG. 9 proceeds to a decision step 62. Otherwise, the method of FIG. 9 proceeds to a step 65.

At the step 62, the block-write function compares the data in the matching data block 1000 to 1125 with the data that has been specified by the higher-level function to be written into the data block. If it is possible to write the new data into the matching data block, then the method of FIG. 9 proceeds to a step 63. Otherwise, the method of FIG. 9 proceeds to a step 64. It may not be possible to write the new data into the matching data block, because such an operation may require that one or more bits of the data block be changed from a binary zero to a binary one, which is not possible using a flash memory, without erasing an entire sector.

At the step 63, the block-write function writes the new data into the matching data block. The method of FIG. 9 then proceeds to a terminal step 69. There's no need to modify the block state register 94, the block label register 96, or the block version register 98. The block state register 94 will already have a cleared used bit to indicate that the matching data block is being used because the matching data block had already been written. The block label register 96 will already contain the block label specified by the higher-level function, or the compare in the decision step 61 would have failed. And the block version register 98 will already contain the current global version number because the global version number could not have been incremented since the last write operation to the matching data block, without the matching data block having been committed. The step 63 of FIG. 9 corresponds with the line 164 of FIG. 7.

At the step 64, the block-write function clears the dirty bit of the matching data block to indicate that the data in that data block is not valid. This causes the matching data block to transition from the written state of box 151 to the dirty state of box 155, as shown by the line 163 in FIG. 7. The method of FIG. 9 then proceeds to a step 65.

At the step 65, the block-write function writes the data specified by the higher-level function into a new data block that is in the erased state of box 150 of FIG. 7. As shown in FIG. 8, a data block in the erased state of box 150 will have all binary ones in its block state register 94, its block label register 96, and its block version register 98. The block-write function will cause the new data block to transition to the written state of box 151 of FIG. 7 by clearing the used bit of the block state register 94 for the new data block. This occurs at a step 66. At a step 67, the block-write function sets the block label register 96 to the block label specified by the higher-level function. At a step 68, the block-write function copies the global version number into the block version register 98 for the new data block. After the step 68, the method of FIG. 9 proceeds to the terminal step 69, which concludes the block-write operation.

Figure 10:
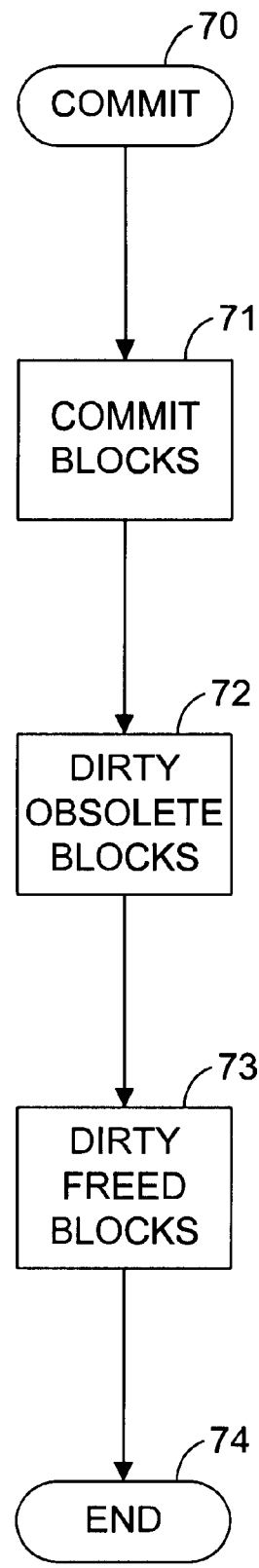
FIG. 10 is a flowchart illustrating a method for committing data that has been written to a flash memory.

FIG. 10 is a flowchart illustrating a method for committing data blocks into memory. Again, a block layer commit function may be called by a higher-level function. As described above, a database application may allow a user to enter or modify data in the database. The application may then prompt the user to determine if the user is ready to commit these changes into the database on a more permanent basis. If the user confirms its intent to commit the changes, the database application may then call the block-commit function.

The method of FIG. 10 begins at an initial step 70. At a step 71, the commit function finds all data blocks that have been written, but not yet committed or dirtied, including data blocks that have been written and then freed. In other words, the commit function determines all data blocks that are in the written state of box 151 or in the freed state of box 153, by finding all data blocks for which the used bit is cleared to a binary zero, and the commit bit and the dirty bit remain at a binary one, with the free bit being either a binary zero or a binary one. The commit function then causes each of these data blocks to transition from the written state of box 151 to the committed state of box 152 as shown by the line 162 in FIG. 7, or from the freed state of box 153 to the freed and committed state of box 154 as shown by the line 166 in FIG. 7. In particular, the commit function clears the commit bit of the block state register 94 for each data block that is in the written state of box 151 or the freed state of box 153. The commit function leaves the block label register 96 and the block version register 98 unchanged.

At a step 72, the commit function finds all committed data blocks that have become obsolete. More particularly, the commit function finds all data blocks that are in either the committed state of box 152 or the freed and committed state of box 154 for which there is another data block that has a matching block label value, that is in either the committed state of box 152 or the committed and freed state of box 154, and that has a larger or more recent block version number. A data block is determined to be in the committed state of box 152 only if the commit bit of the block state register 94 is cleared and both the dirty bit and the free bit are still set to a binary one. A data block is determined to be in the freed and committed state of box 154 only if the commit bit and the free bit of the block state register 94 are cleared and the dirty bit is still set to a binary one. All of these committed data blocks, having more recent, matching committed data blocks, have become obsolete. For each of these obsolete data blocks, the commit function clears the respective dirty bit in the block state register 94, to cause the obsolete data block to transition from the committed state of box 152 to the dirty state of box 155 as shown by the line 165 in FIG. 7 or from the freed and committed state of box 154 to the dirty state of box 155 as shown by the line 167 in FIG. 7.

At a step 73, the commit function causes all data blocks that are in the freed and committed state of box 154 to transition to the dirty state of box 155, as shown by the line 167 in FIG. 7. A data block is in the freed and committed state of box 154 if its free bit and its committed bit are cleared to a binary zero and its dirty bit remains at a binary one. For each of these data blocks in the freed and committed state of box 154, the commit function clears the dirty bit of the block state register 94. The method of FIG. 10 then concludes at a terminal step 74.

In addition to the block layer functions described above, the preferred embodiment of the present invention also includes block layer functions for reading data from the flash memory 50. A first of these functions, a "current read" function, allows for reading the most recent version of a data block 1000 to 1125, whether that version has been committed or not. A second of these functions, a "committed read" function, allows for reading only the most recently committed version of a data block 1000 to 1125. In either case, a higher-level function will typically call the desired block layer read function and specify a block label value for the data block to be read. The current read function will return data to the calling function from the data block 1000 to 1125 that has the specified block label value, that is in either the written state of box 151 or the committed state of box 152 and that has the most recent block version number. The committed read function will return data to the calling function from the data block 1000 to 1125 that has the specified block label value, that is in the committed state of box 152 and that has the most recent block version number. The committed read function is useful, for example, when a first function tries to read a data block at the same time that a second function is trying to write to the same data block. If the first function calls the committed read function, that first function may access a committed version of the data block while the second function is writing a new, uncommitted version of the data block.

Figure 11:
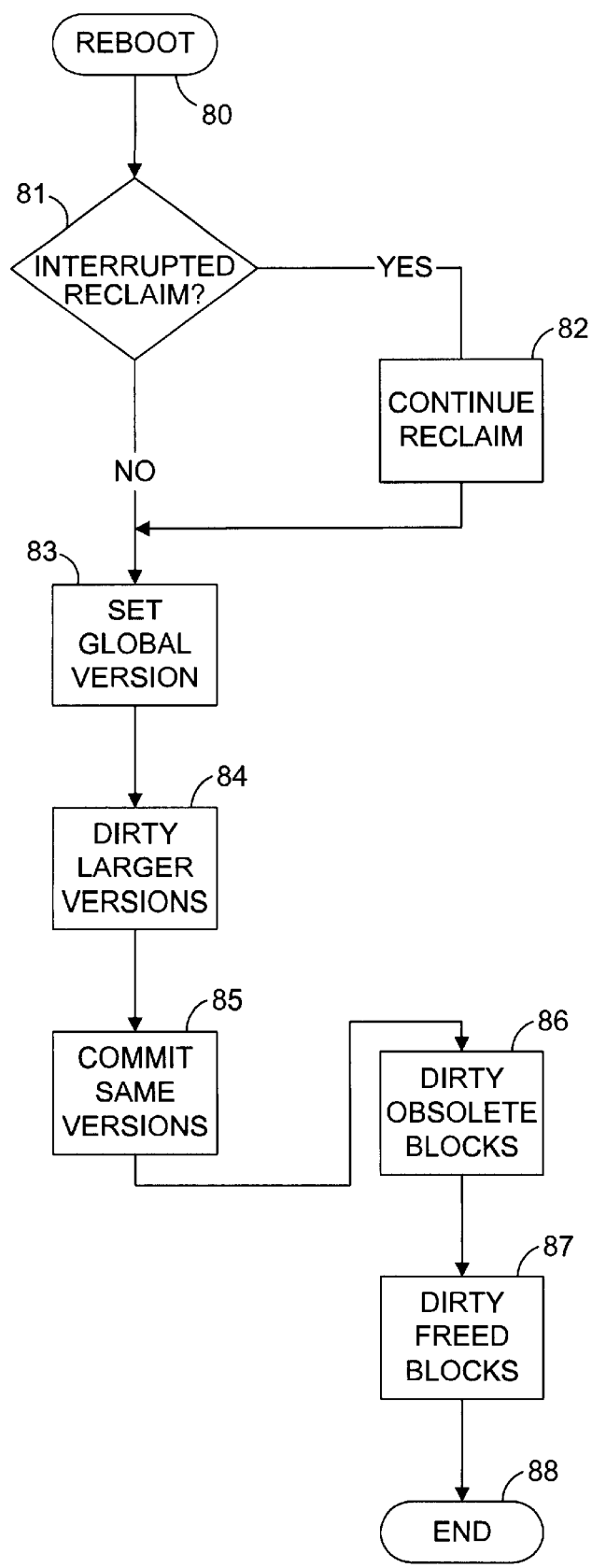

FIG. 11 is a flowchart illustrating a method that is performed by a reboot function of the preferred embodiment of the present invention when the device or system in which the invention has been implemented is booted up after the power is turned on. When the power is turned on, the reboot function may not know whether the power was previously turned off intentionally, inadvertently or through some sort of power disruption. It may also not know what, if any, operations were under progress with respect to the flash memory when the power was interrupted. If a database sector 52 was the reclaiming destination in the reclaiming method of FIG. 5, and if the reclaiming method was in the erase mode of the step 45, when power was interrupted, the contents of the entire database sector 52 may be unpredictable. Alternatively, if there was any write function in progress to the flash memory 50 when the power was interrupted, the state of any bit that was to be cleared to a binary zero will be unknown. Also, if the flash memory is a StrataFlash™ memory, or something equivalent, the state of both bits in the memory cell will be unknown, if either bit was to be cleared to a binary zero. This uncertainty regarding the contents of the flash memory locations applies to write operations performed by both the sector layer functions and the block layer functions. For example, if the sector layer reclaiming function were performing the step 42 of the method of FIG. 5 when power was interrupted, the state of the second bit in the sector state register 90 of sector 4 would be unknown. Similarly, if the sector layer reclaiming function were performing the step 43 of the method of FIG. 5 when power was interrupted, the value in the destination sector register 91 of sector 4 would be unknown. On the block level, as another example, if power were interrupted while the block-level write function were performing the step 65 of the method of FIG. 9, the contents of the data block 1000 to 1125 would be unpredictable for all bits that were to be cleared to a binary zero.

A primary goal of the preferred embodiment of the present invention is to clean up possible corruptions to the data in the flash memory when power is turned on to the device, where such possible data corruptions may have been caused by a power interruption during an erasure of a database sector 52 or during any type of write to the flash memory 50.

The method of FIG. 11 begins at an initial step 80. At a decision step 81, the reboot function determines whether a reclaiming operation was in progress when power was previously interrupted. This is determined through an evaluation of the sector state and destination sector registers for each of the database sectors 52.

Only one reclaiming operation may be in progress at any given time. Therefore, when power was interrupted, at least fourteen of the sixteen database sectors 52 must have been in use and not involved in a reclaiming operation. Each of these database sectors 52 will have a sector state value of 0bX0X1X1X1 and a destination sector value of all binary ones, as shown in FIG. 6 at the step 41 for sector 4 and at the step 48 for sector 9.

If fifteen of the sixteen database sectors 52 have a sector state value of 0bX0X1X1X1 and the sixteenth database sector 52 has a sector state value of 0bX0X0X0X0, then there was no reclaiming operation in progress when power was interrupted. This situation is illustrated in FIG. 6, at the steps 41 and 48, just before a reclaiming operation is initiated and just after a reclaiming operation has been successfully completed, respectively. If the fifteenth and sixteenth database sectors 52 have any other combination of values in their sector state registers, then a reclaiming operation was in progress when the power was interrupted. If there was a reclaiming operation in progress when the power was interrupted, the method of FIG. 11 proceeds to a step 82. Otherwise, the method of FIG. 11 proceeds to a step 83.

At the step 82, the reboot function resumes the interrupted reclaiming procedure. The reboot function must determine which two of the database sectors 52 were involved in the interrupted reclaiming procedure, which of those two was the reclaiming source and which was the reclaiming destination, and the steps of FIG. 5 at which the reclaiming procedure must resume to successfully complete the procedure. The interrupted reclaiming procedure must have been at one of the steps of FIG. 5 between the steps 42 and 47, inclusive. Otherwise, the reboot function would have concluded at the step 81 that there was no interrupted reclaiming procedure.

Looking at the sector state values in FIG. 6 for the reclaiming source for the steps 42 through 47, it can be seen that the sector state value for the reclaiming source must contain either the value 0bX0X0X1X1 or 0bX0X0X0X1. Even if the power were interrupted during a write to the sector state value of the reclaiming source, the reclaiming source would still have one of these two values upon rebooting because there was no other way the flash data could be corrupted.

The sector state value of the reclaiming destination cannot be predicted. The reclaiming destination could have been in the erase mode of the step 45, and so the entire contents of the sector could be unpredictable. In particular, the sector state register of the reclaiming destination could have a value of 0bX0X0X0X0, 0bX0X1X1X1, 0bX0X0X1X1, 0bX0X0X0X1, or any other value. Referring to FIG. 6, however, one can see that, when the sector state register of the reclaiming source has the value 0bX0X0X1X1, the only possible value for the sector state register of the reclaiming destination is 0bX0X0X0X0. The value of the sector state register of the reclaiming destination cannot be corrupted at this point, because no erase or write operation is performed on the database sector 52 of the reclaiming destination until after the sector state value of the reclaiming source is changed to 0bX0X0X0X1. These factors limit the possible combinations of values for the sector state registers of the reclaiming source and the reclaiming destination during the reboot function.

When, at the step 82, the reboot function reads the sector state values of all the database sectors 52, it may find any of the following possible combinations:

1) one has a value of 0bX0X0X1X1, one has a value of 0bX0X0X0X0, and the other fourteen have a value of 0bX0X1X1X1;
2) one has a value of 0bX0X0X0X1, one has a value of 0bX0X0X1X1, and the other fourteen have a value of 0bX0X1X1X1;
3) one has a value of 0bX0X0X0X1 and the other fifteen have a value of 0bX0X1X1X1;
4) one has a value of 0bX0X0X0X1, one has a value of 0bX0X0X0X0, and the other fourteen have a value of 0bX0X1X1X1;
5) one has a value of 0bX0X0X0X1, one has a value of anything other than 0bX0X0X0X0, 0bX0X0X0X0, 0bX0X0X1X1, and 0bX0X1X1X1, and the other fourteen have a value of 0bX0X1X1X1; or
6) two have a value of 0bX0X0X0X1 and the other fourteen have a value of 0bX0X1X1X1. These are all of the possibilities for the sector state values at this point in the reboot function.

For combination 1), the database sector 52 with the sector state value of 0bX0X0X1X1 was the reclaiming source during the interrupted reclaiming procedure and the one with the sector state value of 0bX0X0X0X0 was the reclaiming destination. In this case, the reboot function will finish the previous reclaiming procedure, resuming at the step 43 by writing the encoded block number of the reclaiming destination into the destination sector register of the reclaiming source and then proceeding onto the step 44. If desired, the reboot function could first read the destination sector register of the reclaiming source to determine if it already contains the encoded block number of the reclaiming destination, and possibly skip the step of writing this value. The destination sector register of the reclaiming source will at least contain some value that can be written to the desired value.

For combination 2), the database sector 52 with the sector state value of 0bX0X0X0X1 was the reclaiming source and the one with the sector state value of 0bX0X0X1X1 was the reclaiming destination. In this case, the reboot function will finish the previous reclaiming procedure, resuming at the step 45 by erasing the reclaiming destination and then proceeding onto the step 46.

For combination 3), the database sector 52 with the sector state value of 0bX0X0X0X1 was the reclaiming source. However, the reclaiming destination cannot be determined simply by looking at the sector state values of the other database sectors 52 because they all have the value of 0bX0X1X1X1. In this case, the destination sector register of the reclaiming source will contain the encoded sector number of the reclaiming destination. Again, the reboot function will finish the previous reclaiming procedure, resuming at the step 45 by erasing this reclaiming destination and then proceeding onto the step 46.

For combination 4), the database sector 52 with the sector state value of 0bX0X0X0X1 is again the reclaiming source and the one with the sector state value of 0bX0X0X0X0 was the reclaiming destination. Again, the reboot function will finish the previous reclaiming procedure, resuming at the step 45 by erasing this reclaiming destination and then proceeding onto the step 46.

For combination 5), the database sector 52 with the sector state value of 0bX0X0X0X1 is again the reclaiming source and the one that does not have a sector state value of 0bX0X1X1X1 was the reclaiming destination. Again, the reboot function will finish the previous reclaiming procedure, resuming at the step 45 by erasing this reclaiming destination and then proceeding onto the step 46.

For combination 6), the database sectors 52 that have the sector state value of 0bX0X0X0X1 are the two that were involved in the interrupted reclaiming procedure. The reboot function can determine which of these was the reclaiming source and which was the reclaiming destination by comparing the destination sector values for each of these database sectors 52. At least one of the destination sector registers for these two database sectors 52 will contain the encoded sector number of the other database sector 52. Suppose that the destination sector register of a first of these database sectors 52 contains the encoded sector number of the second of these database sectors 52. If the destination sector register of the second of these database sectors 52 does not also contain the encoded sector number of the first of these database sectors 52, then the first of these database sectors 52 was the reclaiming source and the second of these database sectors 52 was the reclaiming destination. If the destination sector register of the second of these database sectors 52 does contain the encoded sector number of the first of these database sectors 52, then either the first of these database sectors 52 was the reclaiming source and the second was the reclaiming destination, or the opposite must be true. However, only one of these two possibilities will be a permissible reclaiming procedure under the limitations of FIG. 4 and the corresponding mathematical equation described above. Therefore, these same limitations may be used to determine which of these two possibilities is correct. If the two database sectors 52 that have the sector state values of 0bX0X0X0X1 are the sectors 4 and 9, for example, then the reboot function determines whether the sector 9 is a permissible reclaiming destination for the sector 4 or whether the sector 4 is a permissible reclaiming destination for the sector 9. As described above, and as illustrated in FIG. 4, the sector 4 is a permissible reclaiming destination for the sector 9. On the other hand, if the line 302 was rotated so that an end 306 or 308 were proximate to the sector 4 in a clockwise direction, then the line 302 would cut through the sectors 4 and 5 at one end and through the sectors 12 and 13 at the other end. This would show that the sector 9 is not a permissible reclaiming destination for the sector 4 because the two database sectors 52 would be on opposite sides of the line 302. Thus, the only possible scenario is that the sector 9 was the reclaiming source and the sector 4 was the reclaiming destination.

This same approach can be used for any combination of two database sectors 52 to determine which of the two database sectors 52 was the reclaiming source and which was the reclaiming destination. This is because the permissible reclaiming combinations are mutually exclusive. In other words, it is never permissible for a first database sector 52 to be a reclaiming destination for a second database sector 52 and for the second database sector 52 to be a reclaiming destination for the first database sector 52. A person of skill in the art will appreciate that there are various other algorithms that can ensure that permissible reclaiming combinations are mutually exclusive. For example, a rule can be implemented whereby sectors 4 to 7 are permissible reclaiming sources for sectors 0 to 3, sectors 8 to 11 are permissible reclaiming sources for sectors 4 to 7, sectors 12 to 15 are permissible reclaiming sources for sectors 8 to 11, and sectors 0 to 3 are permissible reclaiming sources for sectors 12 to 15. These various other algorithms could also be used in an implementation of the present invention.

Once the reboot function determines which of the two database sectors 52 that have a state sector value of 0bX0X0X0X1 was the reclaiming source and which was the reclaiming destination in the interrupted reclaiming procedure, then the reboot function will finish the previous reclaiming procedure, resuming at the step 45 by erasing the reclaiming destination and then proceeding onto the step 46.

After the step 82, the method of FIG. 11 proceeds to the step 83.

At the step 83, the reboot function sets the global version counter to an appropriate value. This appropriate value is determined by scanning the block version values for all of the data blocks 1000 to 1125 in all of the database sectors 52 that have a block state value of 0bX0X0X1XX. These data blocks are in the committed state of box 152 or the freed and committed state of box 154 of FIG. 7. The global version counter is set to the largest of these block version values.

At a step 84, the reboot function clears the dirty bit of the block state register 94 for every data block 1000 to 1125 of every database sector 52 that has a block version number that is greater than the newly set global version number. This is done because the data in these data blocks have not been committed. If the data have not been committed, then it is possible that the data were being written when power was interrupted, so the integrity of the data may have been compromised. In addition, the reboot function does not know if the user intended to commit this data. Generally, data will not be committed unless a database management system confirms that a user intends to commit the data.

At a step 85, the reboot function clears the commit bit of the block state register 94 for every data block 1000 to 1125 of every database sector 52 that has a block version number that is equal to the newly set global version number. Based on the result of the step 83, some of the data blocks that have this particular block version number must have been committed. If there are any data blocks in the written state of box 151 or in the freed state of box 153 that have this block version number, then the block-commit procedure of FIG. 10 must have been interrupted. Otherwise, all of the data blocks that were in either the written state of box 151 or the freed state of box 153 and that had that particular block version number, would have been committed in the same procedure. In this case, the reboot function finishes the interrupted block-commit procedure. The step 85 of FIG. 11 corresponds with the step 71 of FIG. 10.

At a step 86, the reboot function clears the dirty bit of the block state register 94 for every obsolete, committed data block 1000 to 1125, as described above. This step 86 corresponds with the step 72 of FIG. 10.

At a step 87, the reboot function clears the dirty bit of the block state register 94 for every data block 1000 to 1125 that is in the freed and committed state of box 154. This step 87 corresponds with the step 73 of FIG. 10.

After the step 87, the reboot function concludes at a terminal step 88. At this point, fifteen of the sixteen database sectors 52 are in use and the other database sector 52 is ready to be a reclaiming destination in a reclaiming procedure. For each of the fifteen database sectors 52 that are in use, the integrity of the data in each of the data blocks 1000 to 1125 and the status blocks 140 and 141 can be assured, or the corresponding data block 1000 to 1125 has been marked as dirty.

There are various aspects of the present invention that improve the integrity of data in a flash memory 50. But these different aspects of the invention do not all have to be implemented in the same embodiment. For example, one embodiment of the present invention may implement the reclaiming method of FIG. 4 and the steps 81 and 82 of FIG. 11, without implementing the block-level functions of the preferred embodiment. This would at least improve the integrity of the data in the flash memory 50 at the sector level. A designer of such an embodiment may accept the possibility of having data corruption at during block-level functions, or may implement other techniques at the block level to improve data integrity. Similarly, the block-level aspects of the invention may be implemented in an embodiment of the present invention, without implementing the sector level aspects of the invention. Other aspects of the invention may also be implemented in different ways. For example, the order of the bits in the sector state registers and the block state registers may be rearranged. Or there may be different combinations of bits in the sector state registers and the block state registers. Or the sector numbers may be encoded in a different manner for storage in the destination sector registers. Also, the block label registers, the block version registers, and the global version counter may be implemented in a different manner.

Appendix A of this specification contains source code in the C programming language to implement one specific embodiment of the present invention. A "block," as used in the above description, is referred to as a "cluster" in the source code, while a "block label," as used in the above description, is referred to as a "block" in the source code. The embodiment of Appendix A is designed for a flash memory component having 16 database sectors 52, with each database sector 52 being divided into 64 blocks of data, with each block containing 1024 bytes of data. In Appendix A, the Block_Commit function implements the block-commit function of FIG. 10, the Block_Backout function implements the block-level function for backing out of uncommitted changes, the Block_Free function implements the block-level free function, and the Block_Write function implements the block-level write function of FIG. 9. The Block_Init function, and the various functions called directly or indirectly by the Block_Init function, implements the reboot function of FIG. 11. The Flash_Hardware functions, such as Flash_Hardware_EraseSector, Flash_Hardware_Write, Flash_Hardware_AndWord, and Flash_Hardware_WriteCheck are simple functions that are dependent on the actual flash memory component used. These Flash_Hardware functions can be easily programmed, based on the specifications for the flash memory component used.

The present invention is described in some detail with specific reference to a preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A method of maintaining a plurality of versions of a set of data in a plurality of data blocks in memory, each of said data blocks having a block version register, the method comprising the steps of:

setting a global version register to an initial value;

changing the value in the global version register each time a commit function is performed to commit written data blocks into memory; and copying the value from the global version register to the block version register for a data block, when the data block is written with data, wherein the global version register is initially cleared to zero and the value in the global version register is incremented each time a commit function is performed;

wherein when power is turned on after a power interruption, a new value is determined for the global version register that is the highest value in a block version register for any written data block that has been committed into memory and this new value is written into the global version register.

2. The method of claim 1, wherein, after the new value is written into the global version register, any data block, that has a value in the block version register for that data block that is higher than the value in the global version register, is marked to indicate that the data block has invalid data.

3. The method of claim 1, wherein, after the new value is written into the global version register, any data block, that has a value in the block version register for that data block that is higher than the value in the global version register, is marked to indicate that the data block has invalid data.

4. The method of claim 3, wherein, after the data block is marked to indicate that the data block has invalid data, any committed data block that has become obsolete is marked to indicate that the data block has invalid data.

5. The method of claim 4, wherein, before the new value is determined for the global version register, the method comprises the following steps:

determining whether a previous reclaiming operation was interrupted by the power interruption; and if a previous reclaiming operation was interrupted by the power interruption, completing the interrupted reclaiming operation.

6. A method of reclaiming data from a first data sector of a flash memory to a second data sector of a flash memory in a manner that enables for a resumption of the reclaiming method in the event of a power interruption during the method, the method comprising the steps of:

writing a first value to a sector state register for the first data sector to indicate that the first data sector is in a first reclaiming state;

writing a second value to a destination sector register for the first data sector to indicate that the first data sector will be reclaimed to the second data sector;

writing a third value to the sector state register for the first data sector to indicate that the first data sector is in a second reclaiming state;

erasing the second data sector;

copying valid data from the first data sector to the second data sector;

writing a fourth value to the sector state register for the second data sector to indicate that the valid data from the first data sector has been successfully copied to the second data sector; and writing a fifth value to the sector state register for the first data sector to indicate that the first data sector has been successfully reclaimed to the second data sector, wherein:

reclaiming from the first data sector to the second data sector is permissible, while reclaiming from the second data sector to the first data sector is not permissible.

7. The method of claim 6, wherein the sector state registers and the destination sector register reside in the flash memory.

8. The method of claim 7, wherein each of the sector state registers and the destination sector register comprises a plurality of memory cells, and each memory cell has a plurality of bits, wherein writing to a first bit of a memory cell may affect one or more other bits in the memory cell in case of a power interruption, and only one bit is used in each of the plurality of memory cells of the sector state registers and the destination sector register.

9. The method of claim 8, wherein the sector state register for the first data sector contains a binary value of 0bX0X1X1X1 at the beginning of the reclaiming method.

10. The method of claim 9, wherein the sector state register for the second data sector contains a binary value of 0bX0X0X0X0 at the beginning of the reclaiming method.

11. The method of claim 10, wherein a sector state register for a third data sector contains a binary value of 0bX0X1X1X1 at the beginning of the reclaiming method.

12. The method of claim 6, wherein the first value is a binary value of 0bX0X0X1X1.

13. The method of claim 6, wherein the third value is a binary value of 0bX0X0X0X1.

14. The method of claim 6, wherein the fourth value is a binary value of 0bX0X1X1X1.

15. The method of claim 6, wherein the fifth value is a binary value of 0bX0X0X0X0.

16. The method of claim 6, wherein the second value is an encoded sector number for the second data sector.

17. The method of claim 16, wherein the encoded sector number is obtained by duplicating each bit of a binary sector number for the second data sector.

18. The method of claim 6, wherein a possible reclaiming source is a permissible reclaiming source for a reclaiming destination if:

$$(RD-RS+NS) \% NS < NS/2$$

wherein RD is a sector number of the reclaiming destination, RS is a sector number of the possible reclaiming source, NS is a total number of data sectors in the flash memory, and "%" indicates a mathematical operation of dividing a first number by a second number and taking the remainder.

19. A system for managing data in a flash memory, the flash memory comprising a first plurality of data sectors, each of said first plurality of data sectors comprising a second plurality of data blocks, the system comprising:

a processor for executing one or more functions for managing the data in the flash memory;

a reclaiming function for copying a plurality of valid data from a reclaiming source sector to a reclaiming destination sector and for erasing the reclaiming source sector;

a first plurality of sector state registers for indicating a state for each of said first plurality of sectors, wherein a sector may be in a used state, a first reclaiming state, a second reclaiming state, or a reclaimed state; and a destination block register for indicating a reclaiming destination sector to which a reclaiming source sector is being reclaimed during a reclaiming operation, wherein, the reclaiming function:

sets the sector state register for a reclaiming source sector to indicate that the reclaiming source sector is in the first reclaiming state;

then sets the destination block register to indicate a reclaiming destination sector;

then sets the sector state register for the reclaiming source sector to indicate that the reclaiming source sector is in the second reclaiming state;

then erases the reclaiming destination sector;

then copies a plurality of valid data from the reclaiming source sector to the reclaiming destination sector;

then sets the sector state register for the reclaiming destination sector to indicate that the reclaiming destination sector is in the used state; and then sets the sector state register for the reclaiming source sector to indicate that the reclaiming source sector is in the reclaimed state;

wherein permissible combinations of a reclaiming source sector and a reclaiming destination sector are mutually exclusive;

and wherein, if power is interrupted during a reclaiming operation, the reclaiming operation may be resumed when power is supplied again.

20. The system of claim 19, wherein the system comprises a first plurality of destination block registers for indicating a reclaiming destination sector to which each of said first plurality of sectors is being reclaimed when each of said first plurality of sectors is a reclaiming source sector in a reclaiming operation.

21. The system of claim 20, wherein a possible reclaiming source sector is a permissible reclaiming source sector for a reclaiming destination sector if:

$$(RD-RS+NS) \% NS < NS/2$$

wherein RD is a sector number of the reclaiming destination sector, RS is a sector number of the possible reclaiming source sector, NS is the number of data sectors in the first plurality of data sectors, and "%" indicates a mathematical operation of dividing a first number by a second number and taking the remainder.

* * * * *